(12) United States Patent
Son et al.

(10) Patent No.: US 12,057,907 B2
(45) Date of Patent: Aug. 6, 2024

(54) ELECTRONIC DEVICE AND METHOD FOR CONTROLLING ANTENNAS FACING DIFFERENT DIRECTIONS

(71) Applicant: Samsung Electronics Co., Ltd., Gyeonggi-do (KR)

(72) Inventors: Junghwan Son, Gyeonggi-do (KR); Namjun Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 17/963,540

(22) Filed: Oct. 11, 2022

(65) Prior Publication Data

US 2023/0121342 A1   Apr. 20, 2023

Related U.S. Application Data

(63) Continuation of application No. PCT/KR2022/013386, filed on Sep. 6, 2022.

(30) Foreign Application Priority Data

Oct. 20, 2021   (KR) .................... 10-2021-0140624

(51) Int. Cl.
  *H04B 7/06*    (2006.01)
  *H04B 7/08*    (2006.01)
  *H04B 17/309*  (2015.01)

(52) U.S. Cl.
  CPC ............. *H04B 7/0617* (2013.01); *H04B 7/08* (2013.01); *H04B 17/309* (2015.01)

(58) Field of Classification Search
  CPC ...... H04B 7/0617; H04B 7/08; H04B 17/309; H04B 7/0608; H04B 7/0689; H04B 17/252; H04B 17/382; H04B 7/0814
  See application file for complete search history.

(56) References Cited

U.S. PATENT DOCUMENTS 7,525,493 B2 *  4/2009  Iwai ..................... H01Q 1/245
                                                   343/702
7,684,802 B2    3/2010  Jalali
                (Continued)

FOREIGN PATENT DOCUMENTS

CN      112234343 A     1/2021
JP      2019-21978 A    2/2019
                (Continued)

OTHER PUBLICATIONS

International Search Report dated Dec. 26, 2022.
Written Opinion dated Dec. 26, 2022.

*Primary Examiner* — Sung S Ahn
(74) *Attorney, Agent, or Firm* — Cha & Reiter, LLC

(57) ABSTRACT

An electronic device includes a first antenna facing a first direction, a second antenna facing a second direction, and at least one processor configured to obtain a first value indicating a quality of a first signal received via a beam formed by using the first antenna and a second value indicating a quality of a second signal received via a beam formed by using the second antenna; based on identifying that a value from among the first value and the second value is greater than or equal to a reference value, enable both the first antenna and the second antenna; based on identifying that the first value is less than the reference value and is greater than or equal to the second value, enable the first antenna; and based on identifying that the second value is less than the reference value and is greater than the first value, enable the second antenna.

20 Claims, 19 Drawing Sheets

(56) References Cited

U.S. PATENT DOCUMENTS

| | | |
|---|---|---|
| 9,078,150 B2 * | 7/2015 | Jung ................. H04W 36/0085 |
| 10,886,623 B2 | 1/2021 | Son et al. |
| 2019/0215689 A1 | 7/2019 | Kim et al. |
| 2020/0314721 A1 | 10/2020 | Cheng et al. |
| 2021/0351835 A1 | 11/2021 | Woo et al. |

FOREIGN PATENT DOCUMENTS

| | | |
|---|---|---|
| KR | 10-2007-0116161 A | 12/2007 |
| KR | 10-2020-0041194 A | 4/2020 |
| KR | 10-2020-0121602 A | 10/2020 |
| KR | 10-2021-0019888 A | 2/2021 |

* cited by examiner

ELECTRONIC DEVICE AND METHOD FOR CONTROLLING ANTENNAS FACING DIFFERENT DIRECTIONS

CROSS-REFERENCE TO RELATED APPLICATION(S)

This application is a continuation application that is based on and claims priority under 35 U.S.C. § 120 to PCT International Application No. PCT/KR2022/013386, which was filed on Sep. 6, 2022, and claims priority to Korean Patent Application No. 10-2021-0140624, filed on Oct. 20, 2021, in the Korean Intellectual Property Office, the disclosure of which are incorporated by reference herein their entirety.

BACKGROUND

Technical Field

One or more embodiments disclosed herein generally relate to an electronic device and a method for controlling antennas facing different directions.

Description of Related Art

New radio (NR) for 5G (fifth generation) cellular communication supports communication in FR2 (frequency range 2) as well as FR1 (frequency range 1) for enhanced mobile broadband (eMBB). An electronic device may transmit a signal via at least one beam formed by using a plurality of antennas in order to increase the distance at which the signal in FR2 is transmitted.

SUMMARY

An electronic device may transmit a signal on frequency range 2 (FR2) to an external electronic device through a beam or may receive the signal from the external electronic device through the beam. The beam used to transmit or receive the signal may be identified from a plurality of beams that may be formed by using a plurality of antennas of the electronic device. For example, beam training for identifying the beam from the plurality of beams may be required before transmitting the signal to the external electronic device or receiving the signal from the external electronic device.

Meanwhile, the electronic device may be moving at a high speed. Since the relative positional relationship between the electronic device and the external electronic device is changed by the high-speed movement of the electronic device, beam training may be required for communication between the electronic device and the external electronic device. When the time consumed for beam training is relatively long with respect to the moving speed of the electronic device, the quality of communication between the electronic device and the external electronic device may deteriorate.

The technical problems to be achieved in this document are not limited to those described above, and other technical problems not mentioned herein will be clearly understood by those having ordinary knowledge in the art to which the present disclosure belongs, from the following description.

According to an embodiment, an electronic device may comprise a first antenna array comprising a first antenna facing a first direction, a second antenna array comprising a second antenna facing a second direction, and at least one processor, operably coupled with the first antenna array and the second antenna array, configured to obtain a first value indicating a quality of a signal received via a beam formed by using the first antenna and a second value indicating a quality of a signal received via a beam formed by using the second antenna; based on identifying that a value from among the first value and the second value is greater than or equal to a reference value, enable both the first antenna and the second antenna; based on identifying that the first value is less than the reference value and is greater than or equal to the second value, enable the first antenna from among the first antenna and the second antenna; and based on identifying that the second value is less than the reference value and is greater than the first value, enable the second antenna from among the first antenna and the second antenna.

According to an embodiment, a method for operating an electronic device comprising a first antenna array comprising a first antenna facing in a first direction and a second antenna array comprising a second antenna facing in a second direction may comprise obtaining a first value indicating a quality of a signal received via a beam formed by using the first antenna and a second value indicating a quality of a signal received via a beam formed by using the second antenna; based on identifying that a value from among the first value and the second value is greater than or equal to a reference value, enabling both the first antenna and the second antenna; based on identifying that the first value is less than the reference value and is greater than or equal to the second value, enabling the first antenna from among the first antenna and the second antenna; and based on identifying that the second value is less than the reference value and is greater than the first value, enabling the second antenna from among the first antenna and the second antenna.

According to an embodiment, an electronic device may comprise a first antenna array comprising a first antenna facing a first direction, a second antenna array comprising a second antenna facing a second direction, and at least one processor, operably coupled with the first antenna array and the second antenna array, configured to obtain a first value indicating a quality of a signal received via the first antenna using a spatial domain reception filter and a second value indicating a quality of a signal received via the second antenna using a spatial domain reception filter; based on identifying that a value from among the first value and the second value is greater than or equal to a reference value, enable both the first antenna and the second antenna; based on identifying that the first value is less than the reference value and is greater than or equal to the second value, enable the first antenna from among the first antenna and the second antenna; and based on identifying that the second value is less than the reference value and is greater than the first value, enable the second antenna from among the first antenna and the second antenna.

According to an embodiment, a method for operating an electronic device comprising a first antenna array comprising a first antenna facing in the first direction and a second antenna array comprising a second antenna facing in the second direction. The method may comprise obtaining a first value indicating a quality of a signal received via the first antenna using a spatial domain reception filter and a second value indicating a quality of a signal received via the second antenna using a spatial domain reception filter; based on identifying that a value from among the first value and the second value is greater than or equal to a reference value, enabling both the first antenna and the second antenna; based on identifying that the first value is less than the reference value and is greater than or equal to the second value, enabling the first antenna from among the first antenna and the second antenna; and based on identifying that the second value is less than the reference value and is greater than the first value, enabling the second antenna from among the first antenna and the second antenna.

The effects that can be obtained from the present disclosure are not limited to those described above, and any other effects not mentioned herein will be clearly understood by those having ordinary knowledge in the art to which the present disclosure belongs, from the following description.

DETAILED DESCRIPTION

The electronic device and method according to certain embodiments can prevent sharp decrease in communication quality that may be caused during high-speed movement by enabling all of the antennas, when a signal having quality greater than or equal to a reference value is present in signals received through antennas facing different directions.

Figure 1:
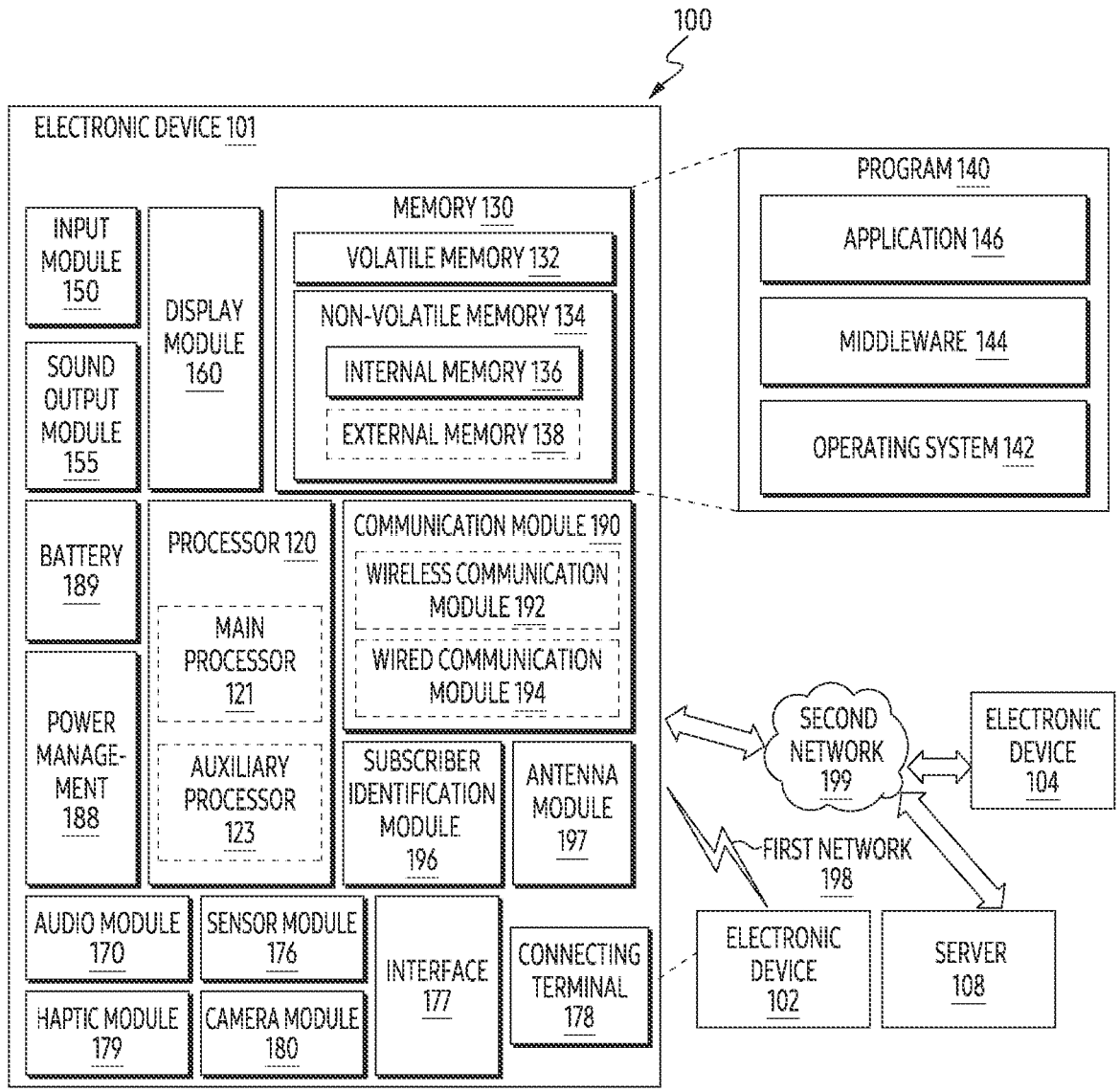
FIG. 1 is a block diagram of an electronic device in a network environment according to an embodiment.

FIG. 1 is a block diagram illustrating an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
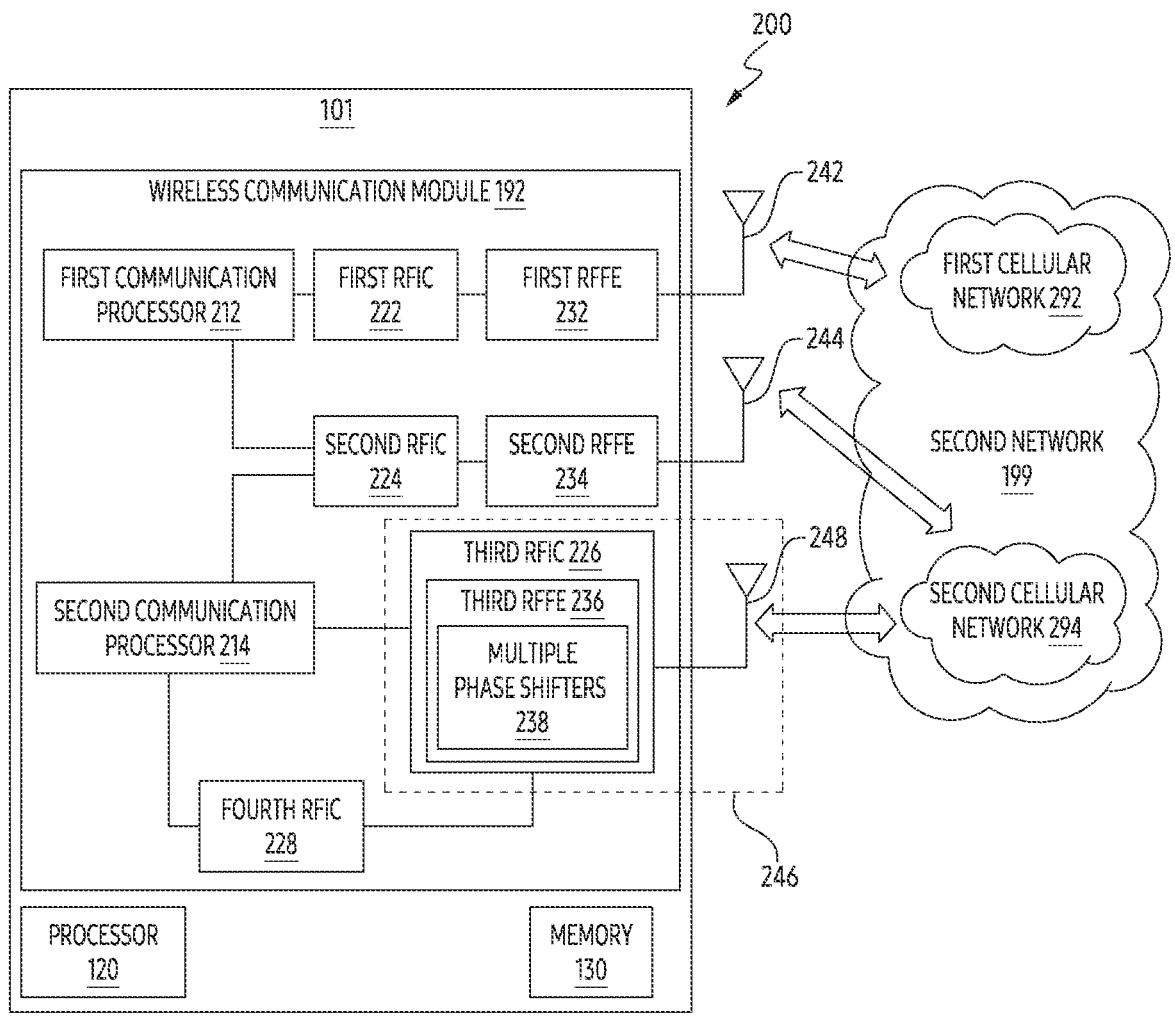
FIG. 2 is a block diagram of an electronic device for supporting legacy network communication and 5G network communication according to an embodiment.

FIG. 2 is a block diagram 200 of the electronic device 101 for supporting legacy network communication and 5G network communication, according to an embodiment. Referring to FIG. 2, the electronic device 101 may include a first communication processor 212, a second communication processor 214, a first radio frequency integrated circuit (RFIC) 222, a second RFIC 224, and a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may constitute at least a part of a wireless communication module 192. According to another embodiment, the fourth RFIC 228 may be omitted or may be included as a part of the third RFIC 226.

The first communication processor 212 may support the establishment of a communication channel of a band to be used for wireless communication with the first cellular network 292 and legacy network communication through the established communication channel. According to certain embodiments, the first cellular network 292 may be a legacy network including a 2nd generation (2G), 3rd generation (3G), 4th generation (4G), and/or long-term evolution (LTE) network. The second communication processor 214 may support the establishment of a communication channel corresponding to a specified band (e.g., approximately 6 GHz to 60 GHz) among bands to be used for wireless communication with the second cellular network 294, and 5G network communication through the established communication channel. According to certain embodiments, the second cellular network 294 may be a 5G network defined by 3GPP. Additionally, according to an embodiment, the first communication processor 212 or the second communication processor 214 may support the establishment of a communication channel corresponding to another specified band (e.g., approximately 6 GHz or less) among bands to be used for wireless communication with the second cellular network 294, and 5G network communication through the established communication channel. According to an embodiment, the first communication processor 212 and the second communication processor 214 may be implemented in a single chip or a single package. According to certain embodiments, the first communication processor 212 or the second communication processor 214 may be formed with the processor 120, the coprocessor 123 of FIG. 1, or the communication module 190 in a single chip or a single package.

Upon transmission, the first RFIC 222 may convert a baseband signal generated by the first communication processor 212 into a radio frequency (RF) signal of approximately 700 MHz to approximately 3 GHz used in the first cellular network 292 (e.g., a legacy network). Upon reception, an RF signal may be obtained from the first cellular network 292 (e.g., a legacy network) through an antenna (e.g., the first antenna module 242), and may be preprocessed through an RFFE (e.g., the first RFFE 232). The first RFIC 222 may convert the preprocessed RF signal into a baseband signal so as to be processed by the first communication processor 212.

Upon transmission, the second RFIC 224 may convert a baseband signal generated by the first communication processor 212 or the second communication processor 214 into an RF signal (hereinafter, referred to as a 5G Sub6 RF signal) of the Sub6 band (e.g., approximately 6 GHz or less) used in the second cellular network 294 (e.g., the 5G network). Upon reception, a 5G Sub6 RF signal may be obtained from the second cellular network 294 (e.g., the 5G network) through an antenna (e.g., the second antenna module 244), and may be preprocessed through an RFFE (e.g., the second RFFE 234). The second RFIC 224 may convert the preprocessed 5G Sub6 RF signal into a baseband signal so as to be processed by a corresponding one of the first communication processor 212 or the second communication processor 214.

The third RFIC 226 may convert a baseband signal generated by the second communication processor 214 into an RF signal (hereinafter, referred to as a 5G Above6 RF signal) of the 5G Above6 band (e.g., approximately 6 GHz to approximately 60 GHz) to be used in the second cellular network 294 (e.g., the 5G network). Upon reception, a 5G Above6 RF signal may be obtained from the second cellular network 294 (e.g., the 5G network) through an antenna (e.g., the antenna 248), and may be preprocessed through the third RFFE 236. For example, the third RFFE 236 may perform preprocessing of the signal by using a phase shifter 238. The third RFIC 226 may convert the preprocessed 5G Above6 RF signal into a baseband signal so as to be processed by the second communication processor 214. According to an embodiment, the third RFFE 236 may be formed as a part of the third RFIC 226.

According to an embodiment, the electronic device 101 may include the fourth RFIC 228 separately from or at least as a part of the third RFIC 226. In this case, the fourth RFIC 228 may convert the baseband signal generated by the second communication processor 214 into an RF signal (hereinafter, referred to as an intermediate frequency (IF) signal) of an intermediate frequency band (e.g., approximately 9 GHz to approximately 11 GHz), and then transmit the IF signal to the third RFIC 226. The third RFIC 226 may convert the IF signal into a 5G Above6 RF signal. Upon reception, a 5G Above6 RF signal may be received from the second cellular network 294 (e.g., the 5G network) through an antenna (e.g., the antenna 248), and may be converted into an IF signal by the third RFIC 226. The fourth RFIC 228 may convert the IF signal into the baseband signal so as to be processed by the second communication processor 214.

According to an embodiment, the first RFIC 222 and the second RFIC 224 may be implemented as a single chip or at least a part of a single package. According to an embodiment, the first RFFE 232 and the second RFFE 234 may be implemented as a single chip or at least a part of a single package. According to an embodiment, at least one of the first antenna module 242 or the second antenna module 244 may be omitted or combined with another antenna module to process RF signals of a plurality of corresponding bands.

According to an embodiment, the third RFIC 226 and the antenna 248 may be disposed on the same substrate to form a third antenna module 246. For example, the wireless communication module 192 or the processor 120 may be disposed on a first substrate (e.g., main PCB). In this case, the third RFIC 226 may be disposed in a partial region (e.g., the lower surface) of a second substrate (e.g., sub PCB) separate from the first substrate, and the antenna 248 may be disposed in another partial region (e.g., the upper surface) to form the third antenna module 246. According to an embodiment, the antenna 248 may include, for example, an antenna array that may be used for beamforming. By disposing the third RFIC 226 and the antenna 248 on the same substrate, it is possible to reduce the length of the transmission line therebetween. This, for example, may reduce the loss (e.g., attenuation) of a signal in a high frequency band (e.g., approximately 6 GHz to approximately 60 GHz) used for 5G network communication by the transmission line. Accordingly, the electronic device 101 may improve the quality or speed of communication with the second cellular network 294 (e.g., the 5G network).

The second cellular network 294 (e.g., the 5G network) may be operated independently of (e.g., Stand-Alone (SA))

or operated to be connected to (e.g., Non-Stand Alone (NSA)) the first cellular network 292 (e.g., the legacy network). For example, in the 5G network, there may be only an access network (e.g., 5G radio access network (RAN) or next-generation RAN (NG RAN)) and no core network (e.g., next-generation core (NGC)). In this case, after accessing the access network of the 5G network, the electronic device 101 may access an external network (e.g., the Internet) under the control of a core network (e.g., evolved packed core (EPC)) of the legacy network. Protocol information for communication with the legacy network (e.g., LTE protocol information) or protocol information for communication with the 5G network (e.g., New Radio (NR) protocol information) may be stored in the memory 230 and may be accessed by other components (e.g., the processor 120, the first communication processor 212, or the second communication processor 214).

Figure 3:
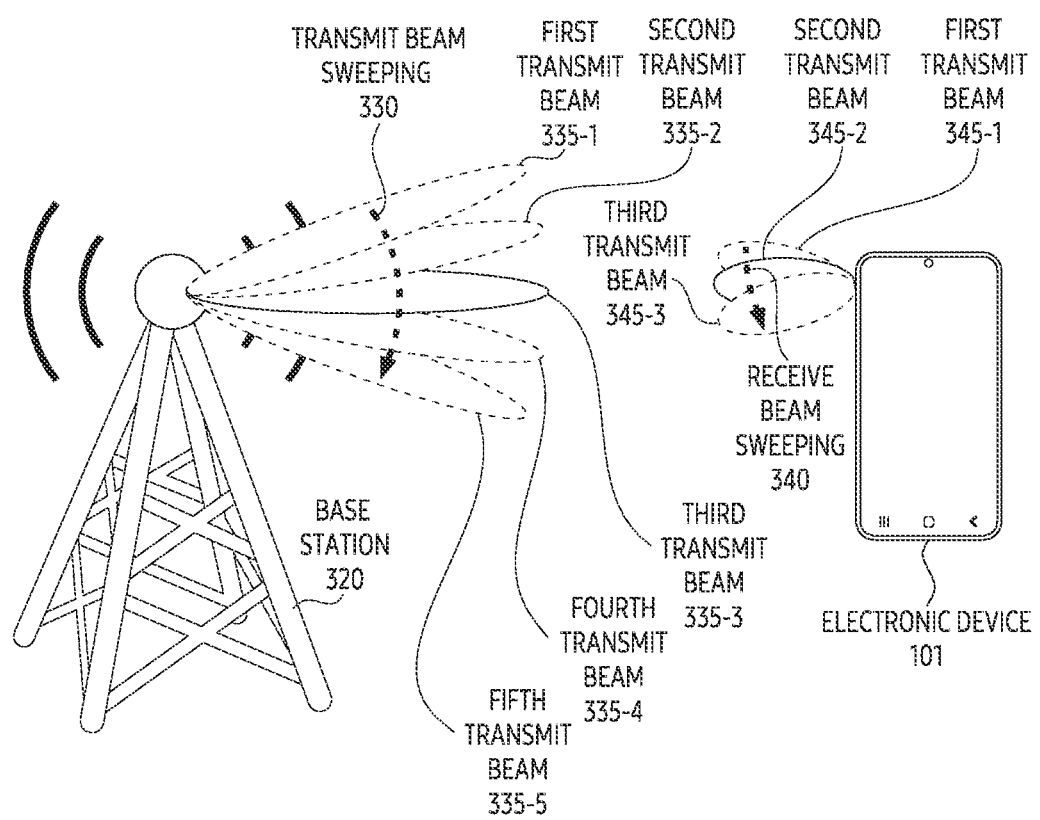
FIG. 3 illustrates an embodiment of an operation for wireless communication connection between a base station and an electronic device in the second network of FIG. 2, which uses a directional beam for wireless connection.

FIG. 3 illustrates an embodiment of an operation for wireless communication connection between a base station 320 and the electronic device 101 by using a directional beam for wireless connection in the second network 294 (e.g., the 5G network) of FIG. 2. The base station (gNodeB (gNB) or transmission reception point (TRP)) 320 may perform a beam detection operation with the electronic device 101 for wireless communication connection. In the illustrated embodiment, for beam detection, the base station 320 may sequentially transmit a plurality of transmit beams, for example, first to fifth transmit beams 331-1 to 331-5 having different directions, thereby making it possible to perform at least one transmit beam sweeping 330.

The first to fifth transmit beams 331-1 to 331-5 may include at least one synchronization sequences (SS)/physical broadcast channel (PBCH) block (SS/PBCH Block). The SS/PBCH Block may be used to periodically measure the channel or beam strength of the electronic device 101.

In another embodiment, the first to fifth transmit beams 331-1 to 331-5 may include at least one channel state information-reference signal (CSI-RS). The CSI-RS may be a reference signal that may be set and transmitted by the base station 320 periodically, semi-persistently or aperiodically. The electronic device 101 may measure the channel or beam strength by using the CSI-RS.

The transmit beams may form a radiation pattern having a selected beam width. For example, the transmit beams may have a broad radiation pattern having a first beam width or a sharp radiation pattern having a second beam width narrower than the first beam width. For example, transmit beams including SS/PBCH block may have broader radiation pattern than transmit beams including CSI-RS.

The electronic device 101 may perform receive beam sweeping 340 while the base station 320 performs the transmit beam sweeping 330. For example, while the base station 320 performs first transmit beam sweeping 330, the electronic device 101 may fix a first receive beam 345-1 in a first direction to receive a signal of an SS/PBCH block transmitted in at least one of the first to fifth transmit beams 331-1 to 331-5. While the base station 320 performs second transmit beam sweeping 330, the electronic device 101 may fix a second receive beam 345-2 in a second direction to receive a signal of an SS/PBCH block transmitted in the first to fifth transmit beams 331-1 to 331-5. In this way, the electronic device 101 may select a communicable receive beam (e.g., the second receive beam 345-2) and a communicable transmit beam (e.g., the third transmit beam 331-3) based on the result of the signal reception operation done via the receive beam sweeping 340.

As described above, after the communicable transmit and receive beams are determined, the base station 320 and the electronic device 101 may transmit and/or receive basic information for cell setting, and based on the information, set information for additional beam operation. For example, the beam operation information may include detailed information on the set beam, SS/PBCH Block, CSI-RS, or setting information on additional reference signal(s).

In addition, the electronic device 101 may continuously monitor the channel and the strength of the beam by using at least one of the SS/PBCH Block and CSI-RS included in the transmit beam. The electronic device 101 may adaptively select a beam having good beam quality by using the monitoring operation. Optionally, when communication is disconnected due to movement of the electronic device 101 or a beam being blocked, the above-mentioned beam sweeping operation may be performed again to determine another communicable beam.

Figure 4:
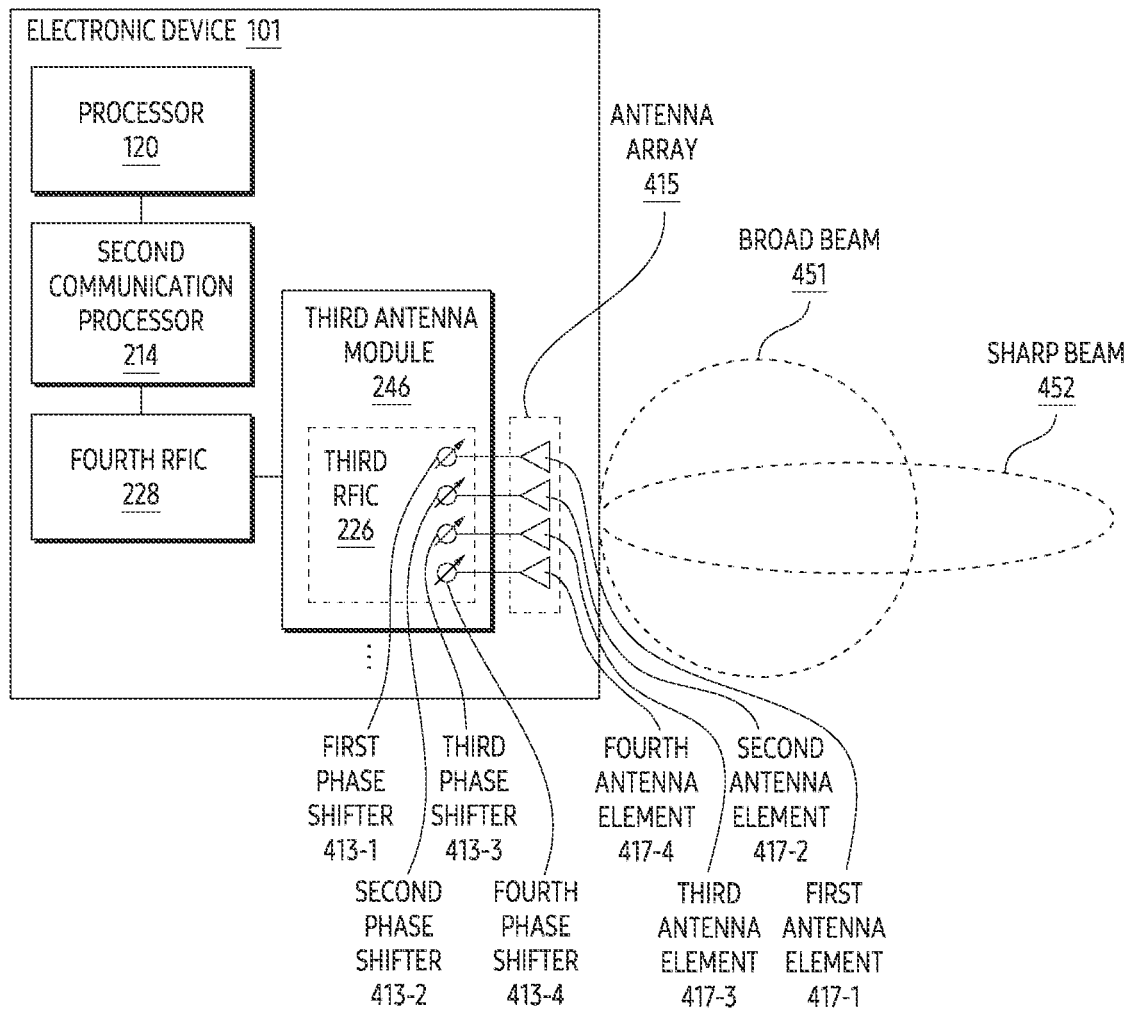
FIG. 4 is a block diagram of an electronic device for 5G network communication according to an embodiment.

FIG. 4 illustrates a block diagram of the electronic device 101 for 5G network communication, according to an embodiment. The electronic device 101 may include the various components illustrated in FIG. 2. However, for clarity and brevity, FIG. 4 illustrates the electronic device 101 as including the processor 120, the second communication processor 214, the fourth RFIC 228, and at least one third antenna module 246.

In the illustrated embodiment, the third antenna module 246 may include first to fourth phase shifters 413-1 to 413-4 (e.g., the phase shifter 238 in FIG. 2) and/or first to fourth antenna elements 417-1 to 417-4 (e.g., the antenna 248 in FIG. 2). Each of the first to fourth antenna elements 417-1 to 417-4 may be electrically connected to corresponding one of the first to fourth phase shifters 413-1 to 413-4 individually. The first to fourth antenna elements 417-1 to 417-4 may form at least one antenna array 415.

The second communication processor 214 may control the first to fourth phase shifters 413-1 to 413-4, thereby controlling the phases of the transmitted and/or received signals through the first to fourth antenna elements 417-1 to 417-4, which makes it possible to generate transmit beams and/or receive beams in various selected directions.

According to an embodiment, the third antenna module 246 may form a beam 451 of the broad radiation pattern (hereinafter, referred to as a "broad beam") or a beam 452 of the sharp radiation pattern (hereinafter, referred to as a "sharp beam") as mentioned above, depending on the number of the used antenna elements. For example, the third antenna module 246 may form the sharp beam 452 when all of the first to fourth antenna elements 417-1 to 417-4 are used, and form the broad beam 451 when only the first antenna element 417-1 and the second antenna element 417-2 are used. The broad beam 451 has broader coverage than the sharp beam 452, but has smaller antenna gain, and thus it may be more effective in searching for a beam. On the other hand, the sharp beam 452 has narrower coverage than the broad beam 451, but has higher antenna gain, and thus it may improve communication performance.

According to an embodiment the second communication processor 214 may utilize a sensor module 176 (e.g., 9-axis sensor, grip sensor, or GPS) for beam search. For example, the electronic device 101 may adjust the beam search position and/or the beam search period based on the position and/or movement of the electronic device 101 by using the sensor module 176. In another example, when the electronic device 101 is gripped by the user, an antenna module having better communication performance may be selected from the plurality of third antenna modules 246 by identifying, using the grip sensor, which part of the device is gripped by the user.

Figure 5:
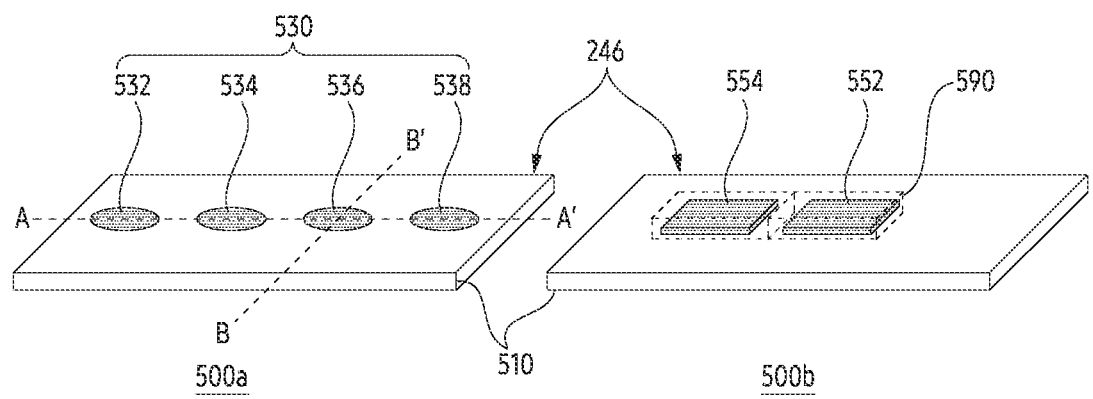
FIG. 5 illustrates an embodiment of a structure of the third antenna module of FIG. 2.
Figure 5:
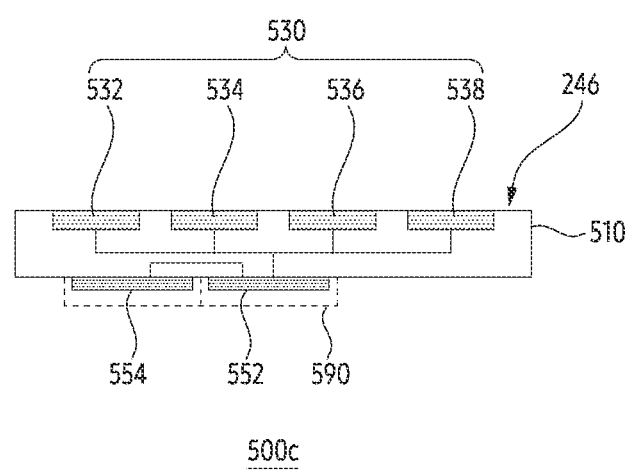

FIG. 5 illustrates, for example, an embodiment of a structure of the third antenna module 246 described with reference to FIG. 2. 500*a* of FIG. 5 is a perspective view of the third antenna module 246 as viewed from one side, and 500*b* of FIG. 5 is a perspective view of the third antenna module 246 as viewed from another side. 500*c* of FIG. 5 is a cross-sectional view of A-A' of the third antenna module 246.

Referring to FIG. 5, in an embodiment, the third antenna module 246 may include a printed circuit board 510, an antenna array 530, a radio frequency integrated circuit (RFIC) 552, and a power manage integrated circuit (PMIC) 554, and a module interface (not shown). The third antenna module 246 may further optionally include a shielding member 590. In other embodiments, at least one of the aforementioned parts, such as the shielding member 590, may be omitted, or at least two of the parts may be integrated together.

The printed circuit board 510 may include a plurality of conductive layers and a plurality of non-conductive layers alternately stacked with the conductive layers. The printed circuit board 510 may provide electrical connection between various electronic components disposed on the printed circuit board 510 and/or other components disposed outside the printed circuit board 510, by using wires and conductive vias formed on the conductive layer.

The antenna array 530 (e.g., 248 in FIG. 2) may include a plurality of antenna elements 532, 534, 536, and 538 arranged to form a directional beam. The antenna elements may be formed on a first surface of the printed circuit board 510 as illustrated. According to another embodiment, the antenna array 530 may be formed inside the printed circuit board 510. According to embodiments, the antenna array 530 may include a plurality of antenna arrays (e.g., dipole antenna array and/or patch antenna array) of various shapes or types.

The RFIC 552 (e.g., the third RFIC 226 in FIG. 2) may be disposed in another region of the printed circuit board 510 (e.g., the second surface opposite to the first surface), to be spaced apart from the antenna array 530. The RFIC 552 may be configured to process signals of various selected frequency bands that are transmitted and received via the antenna array 530. According to an embodiment, upon transmission, the RFIC 552 may convert a baseband signal obtained from a communication processor (not illustrated) into an RF signal of a specified band. Upon reception, the RFIC 552 may convert an RF signal received via the antenna array 530 into a baseband signal and transmit the converted signal to the communication processor.

According to another embodiment, upon transmission, the RFIC 552 may up-convert an IF signal (e.g., approximately 7 GHz to approximately 13 GHz) obtained from an intermediate frequency integrated circuit (IFIC) (e.g., the fourth RFIC 228 in FIG. 2) into the RF signal of the selected band. Upon reception, the RFIC 552 may down-convert the RF signal obtained via the antenna array 530 into an IF signal, and transmit the converted signal to the IFIC.

The PMIC 554 may be disposed in another partial region (e.g., part of the second surface) of the printed circuit board 510, to be spaced apart from the antenna array. The PMIC 554 may receive power or voltage from a main PCB (not shown) and provide power required for various components (e.g., the RFIC 552) of the third antenna module 246.

The shielding member 590 may be disposed on a part (e.g., part of the second surface) of the printed circuit board 510 in order to electromagnetically shield at least one of the RFIC 552 and the PMIC 554. According to an embodiment, the shielding member 590 may be implemented as a shield can.

Although not illustrated, in certain embodiments, the third antenna module 246 may be electrically connected to another printed circuit board (e.g., the main circuit board) through a module interface. The module interface may include a connection member, for example, a coaxial cable connector, a board to board connector, an interposer, or a flexible printed circuit board (FPCB). Using the connection member, the RFIC 552 and/or the PMIC 554 of the third antenna module 246 may be electrically connected to the printed circuit board.

Figure 6:
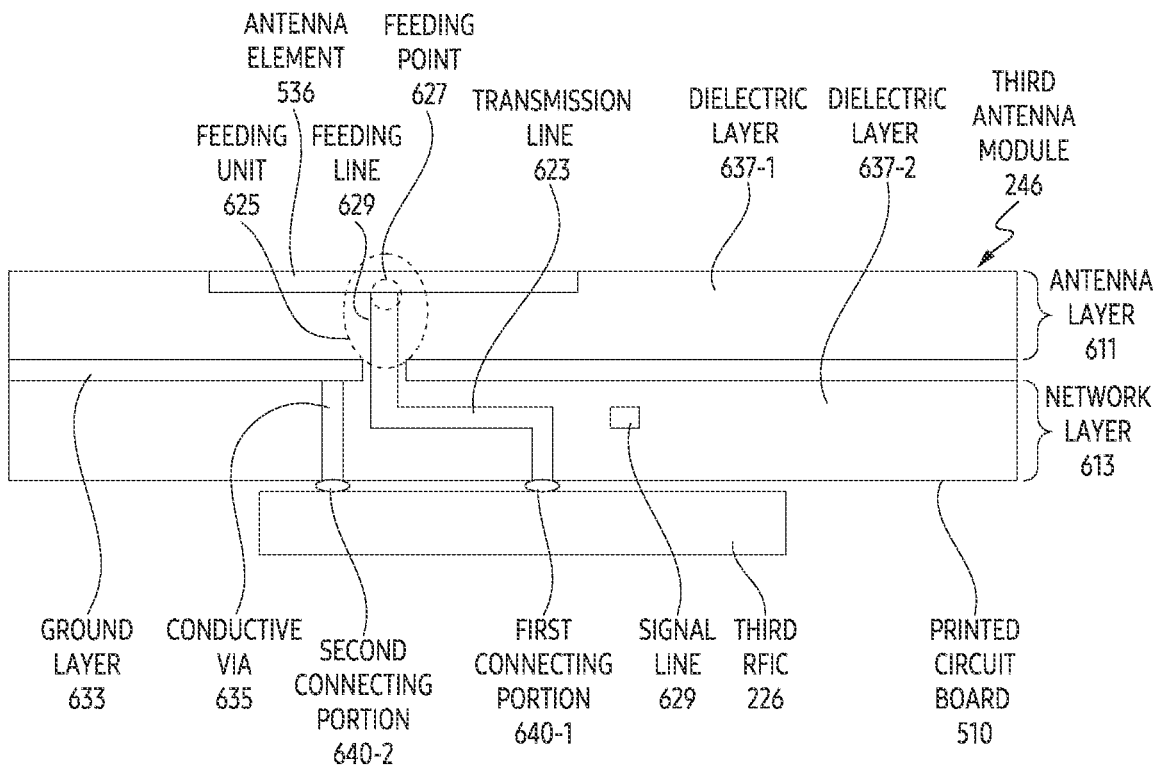
FIG. 6 illustrates a cross-section view of line B-B' of the third antenna module of FIG. 5.

FIG. 6 illustrates a cross-section taken along line B-B' of the third antenna module 246 of 500*a* of FIG. 5. The printed circuit board 510 of the illustrated embodiment may include an antenna layer 611 and a network layer 613.

The antenna layer 611 may include at least one dielectric layer 637-1, and an antenna element 536 and/or a feeding unit 625 formed on the outer surface of or inside of the dielectric layer. The feeding unit 625 may include a feeding point 627 and/or a feeding line 629.

The network layer 613 may include at least one dielectric layer 637-2, at least one ground layer 633 formed on the outer surface of or inside of the dielectric layer, at least one conductive via 635, a transmission line 623, and/or a signal line 629.

In addition, in the illustrated embodiment, the third RFIC 226 may be electrically connected to the network layer 613, for example, through first and second connecting portions (solder bumps) 640-1 and 640-2. In other embodiments, various connecting structures (e.g., solder or ball grid array (BGA)) may be used instead of the connecting portions. The third RFIC 226 may be electrically connected to the antenna element 536 via a first connecting portion 640-1, the transmission line 623, and the feeding unit 625. The third RFIC 226 may also be electrically connected to the ground layer 633 via the second connecting portion 640-2 and the conductive via 635. Although not illustrated, the third RFIC 226 may also be electrically connected to the module interface mentioned above via the signal line 629.

Figure 7:
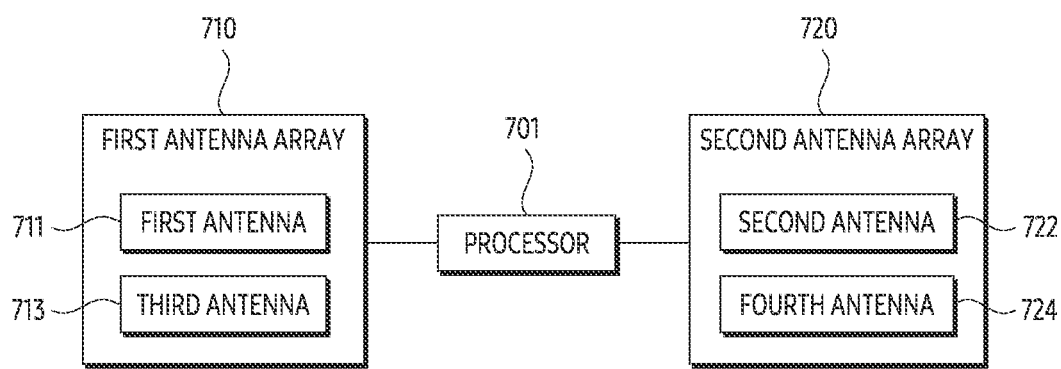
FIG. 7 is a simplified block diagram of an electronic device according to an embodiment.

FIG. 7 is a simplified block diagram of an electronic device according to an embodiment. Such a block diagram may indicate functional configurations of the electronic device 101 illustrated in FIG. 1.

Figure 8A:
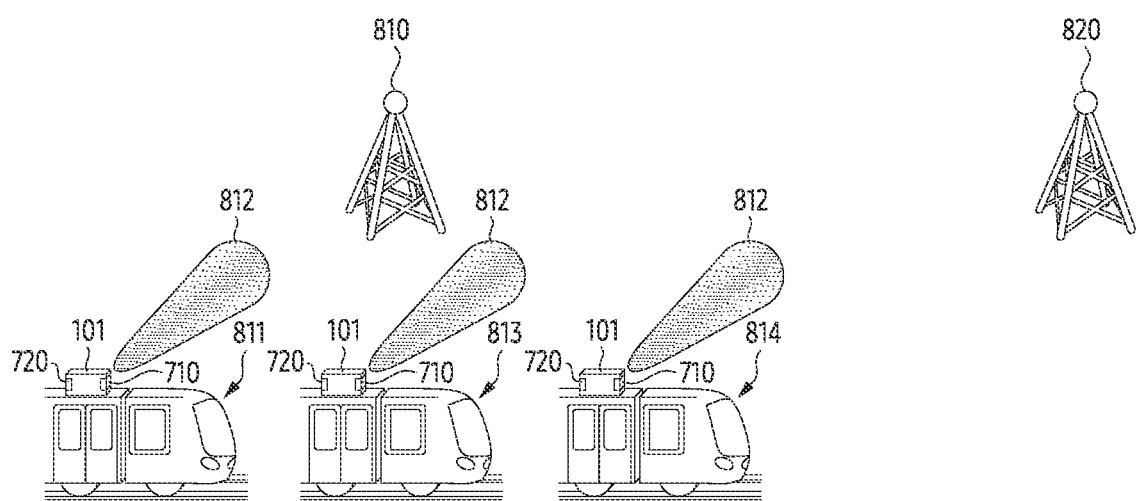
FIG. 8A illustrates an example of communication between an electronic device moving at high speed and a base station.

FIG. 8A illustrates an example of communication between an electronic device moving at high speed and a base station.

Figure 8B:
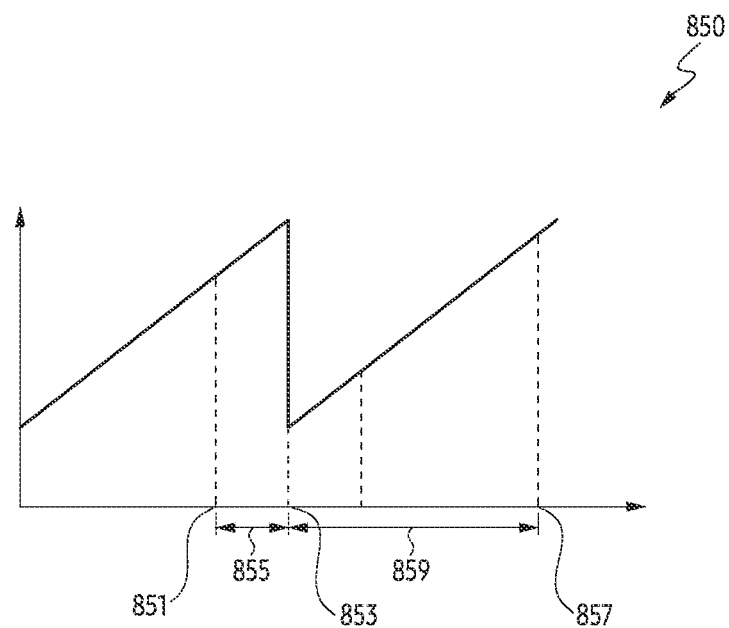
FIG. 8B is a graph illustrating the quality of communication that is changed according to a relative positional relationship between an electronic device and a base station.

FIG. 8B is a graph illustrating the quality of communication that is changed according to the relative positional relationship between an electronic device and a base station.

Figure 9A:
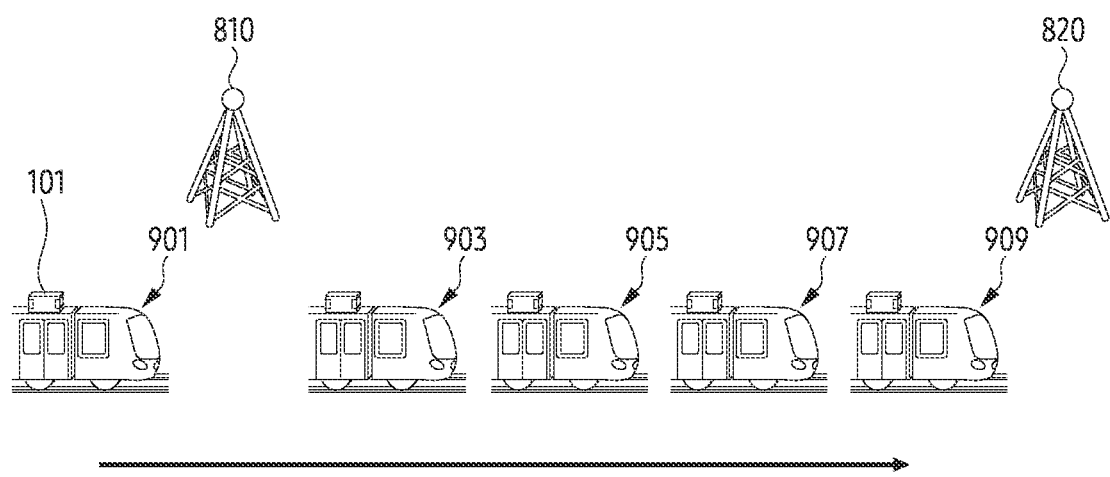
FIG. 9A illustrates an example of a relative positional relationship between an electronic device and a base station that is changed according to high-speed movement of the electronic device according to an embodiment.

FIG. 9A illustrates an example of the relative positional relationship between an electronic device and a base station that is changed according to high-speed movement of the electronic device according to an embodiment.

Figure 9B:
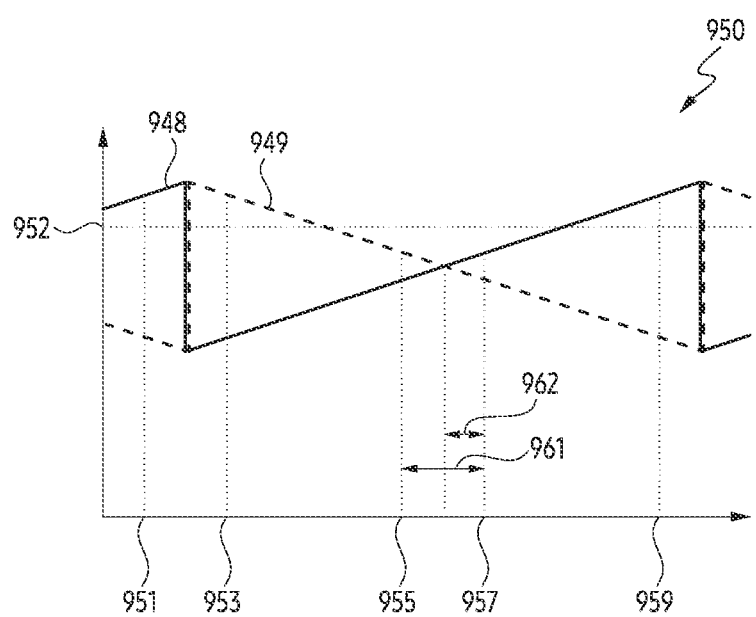
FIG. 9B is a graph illustrating the quality of signals received via antennas facing different directions according to an embodiment.

FIG. 9B is a graph illustrating the quality of signals received via antennas facing different directions according to an embodiment.

Figure 9C:
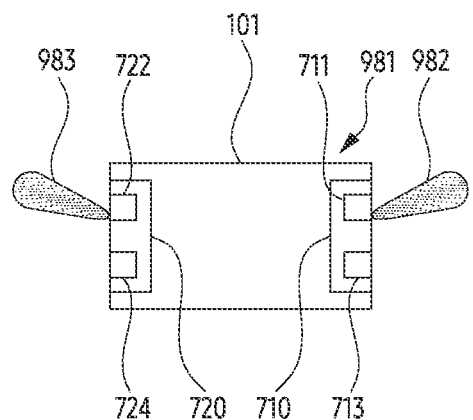
FIG. 9C illustrates an example of a method of controlling antennas according to a relative positional relationship between an electronic device and a base station according to an embodiment.
Figure 9C:
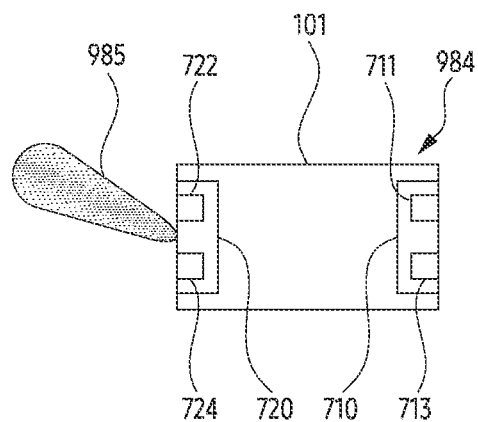
Figure 9C:
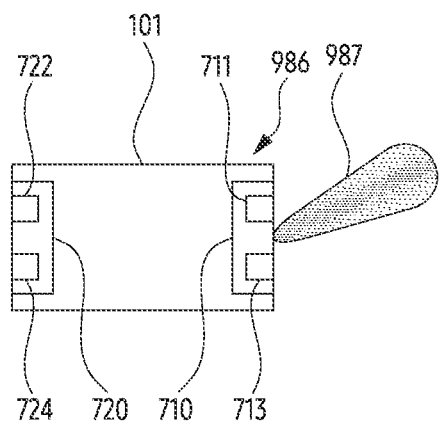

FIG. 9C illustrates an example of a method of controlling antennas according to the relative positional relationship between an electronic device and a base station according to an embodiment.

Figure 10:
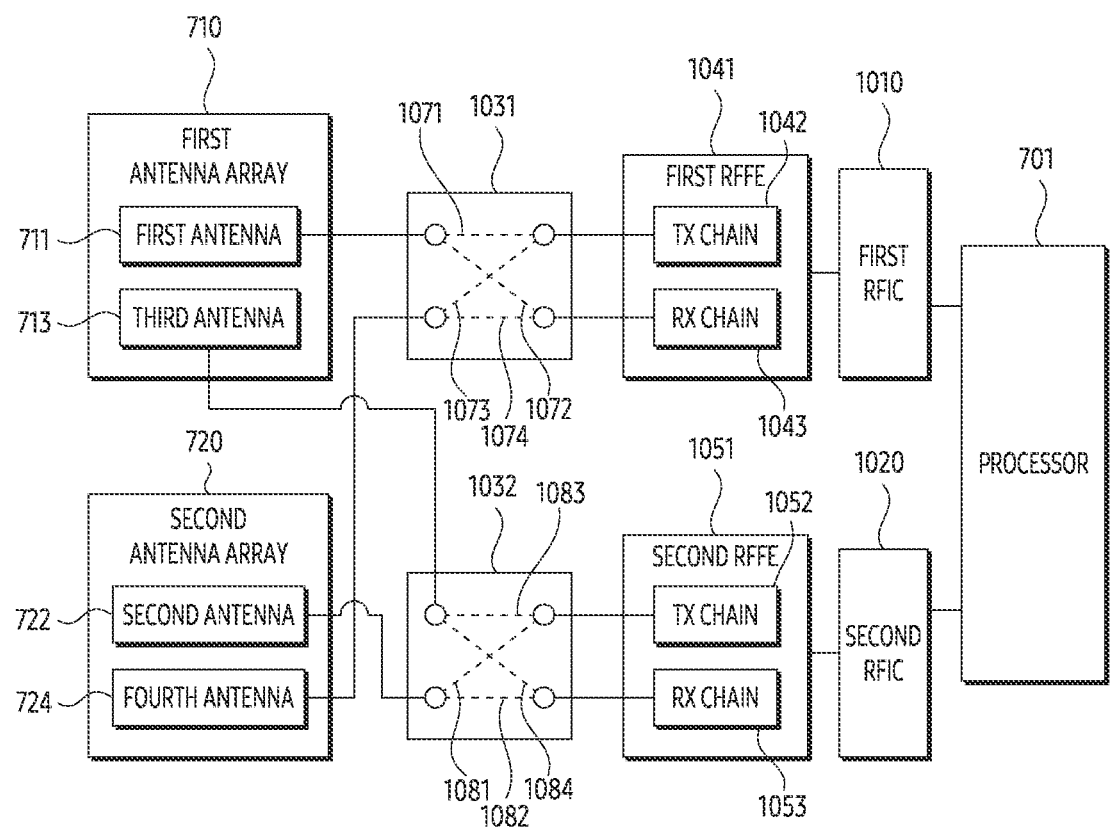
FIG. 10 is a simplified block diagram of an electronic device further comprising a first switch and a second switch according to an embodiment.

FIG. 10 is a simplified block diagram of an electronic device further comprising a first switch and a second switch according to an embodiment.

Referring to FIG. 7, the electronic device 101 may be a device that communicates with an external electronic device (e.g., the electronic device 102). In an embodiment, the electronic device 101 may be user equipment (UE) communicating with a base station. In an embodiment, the electronic device 101 may be an intermediate node that assists communication between a first external electronic device and a second external electronic device. For example, the electronic device 101 may be an access point (AP) or customer-premises equipment (CPE). However, it is not limited thereto.

The electronic device 101 may comprise at least one processor 701, a first antenna array 710, and a second antenna array 720.

The processor 701 in the electronic device 101 may comprise at least a part of the processor 120 illustrated in FIG. 1. For example, the processor 701 may comprise at least one of the main processor 121 shown in FIG. 1 or the coprocessor 123 that is the communication processor.

The processor 701 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

The first antenna array 710 in the electronic device 101 may comprise a plurality of antennas comprising a first antenna 711 facing the first direction and a third antenna 713 facing the first direction. At least some of the plurality of antennas in the first antenna array 710 may be used to form at least one beam. For example, the at least one beam may be used for communication between the electronic device 101 and the external electronic device.

The second antenna array 720 in the electronic device 101 may comprise a plurality of antennas comprising a second antenna 722 facing a second direction different from the first direction and a fourth antenna 724 facing the second direction. For example, in order to expand coverage of the electronic device 101, the first antenna 711 and the third antenna 713 may face the first direction, and the second antenna 722 and the fourth antenna 724 may face the second direction. For example, the second direction may be opposite to the first direction. For example, when the second direction is opposite to the first direction, the first antenna array 710 may be disposed in the first surface of the housing of the electronic device 101 facing the first direction, and the second antenna array 720 may be disposed in the second surface of the housing faced away the first surface of the housing and facing the second direction. Meanwhile, at least some of the plurality of antennas in the second antenna array 720 may be used to form at least one beam.

Meanwhile, the electronic device 101 may communicate with an external electronic device while moving at high speed. For example, the electronic device 101 included in a vehicle, a train, an aircraft, or an unmanned aerial vehicle (UAV) may communicate with the external electronic device. For example, referring to FIG. 8A, the electronic device 101 included in the train moving at high speed may communicate with the base station 810. For example, in state 811, the processor 701 in the electronic device 101 may communicate with the base station 810 via a beam 812 formed by using at least one of the first antenna 711 and the third antenna 713 in the first antenna array 710. For example, the beam 812 may be directed from the electronic device 101 to the base station 810 in the state 811. Since the electronic device 101 is moving at high speed, the state 811 may become the state 813 before completing beam training. In the state 813, the processor 701 may communicate with the base station 810 through the beam 812, since beam training is not completed despite a sudden change in the direction from the electronic device 101 to the base station 810. In the state 813, since the direction of the beam 812 is different from the direction from the electronic device 101 to the base station 810, the quality of communication between the electronic device 101 and the base station 810 may be rapidly reduced. Meanwhile, due to the high-speed movement of the electronic device 101, the state 813 may become the state 814. In the state 814, the processor 701 may perform handover to the base station 820 which is a neighboring base station of the base station 810 and communicate with the base station 820 through the beam 812. For example, referring to FIG. 8B, the horizontal axis of the graph 850 may indicate time, and the vertical axis of the graph 850 may indicate the quality of signal received through the beam 812. In the graph 850, during the time interval 855 between the timing 851 in which the electronic device 101 is in the state 811 and the timing 853 in which the electronic device 101 is in the state 813, the quality of communication between the electronic device 101 and the base station 810 gradually increases due to decrease in the distance between the electronic device 101 and the base station 810, but may decrease rapidly based on the timing 853. Meanwhile, by handover to the base station 820, the quality may be increased during the time interval 859 from the timing 853 to the timing 857 in which the electronic device 101 is in the state 814.

The processor 701 may execute operations for preventing the quality of communication between the electronic device 101 and the base station 810 from rapidly decreasing based on the timing 853.

For example, the processor 701 may obtain a first value indicating the quality of signal (e.g., reference signal) received through a beam formed by using the first antenna 711 in the first antenna array 710. Forming the beam by using the first antenna 711 may include forming the beam using only the first antenna 711 or forming the beam using the first antenna 711 and another antenna (e.g., the third antenna 713) in the first antenna array 710. Receiving a signal through a beam formed using the first antenna 711 may refer to the operation of receiving the signal through the first antenna 711 using a spatial domain reception filter.

The first value may be received signal strength (RSS), reference signal received power (RSRP), received signal strength indicator (RSSI), reference signal received quality (RSRQ), signal to interference noise ratio (SINR), or channel quality indicator (CQI).

For example, the processor 701 may obtain a second value indicating the quality of signal received through a beam formed by using the second antenna 722 in the second antenna array 720. Forming the beam using the second antenna 722 may include forming the beam using only the second antenna 722 or forming the beam using the second antenna 722 and another antenna (e.g., the fourth antenna 724) in the second antenna array 720. Receiving a signal through a beam formed using the second antenna 722 may refer to the operation of receiving the signal through the second antenna 722 using the spatial domain receiving filter.

The second value may be received signal strength (RSS), reference signal received power (RSRP), received signal strength indicator (RSSI), reference signal received quality (RSRQ), signal to interference noise ratio (SINR), or channel quality indicator (CQI).

The processor 701 may identify the relative positional relationship between the electronic device 101 and the external electronic device based on at least a part of the first value and the second value.

For example, referring to FIGS. 9A and 9B, the processor 701 may identify the relative positional relationship between the electronic device 101 and the base station 810 or the relative positional relationship between the electronic device 101 and the base station 820 based on at least a part of the first value and the second value. For example, the processor 701 may identify that the electronic device 101 is in the state 901, based on identifying that the first value is equal to or greater than the second value and that the first value is equal to or greater than the reference value 952, such as at timing 951 in the graph 950, in which the horizontal axis indicates time, the vertical axis indicates signal quality, the line 948 indicates the linearized first value, and the line 949 indicates the linearized second value. For example, the processor 701 may identify that the electronic device 101 is in state 903 based on identifying that the second value is greater than the first value and that the second value is greater than or equal to the reference value 952, such as at timing 953 in graph 950. For example, the processor 701 may identify that the electronic device 101 is in state 905 based on identifying that the second value is greater than the first value and the second value is less than the reference value 952, such as at timing 955 in graph 950. For example, the processor 701 may identify that the electronic device 101 is in state 907 based on identifying that the first value is greater than or equal to the second value and that the first value is less than the reference value 952, such as at timing 957 in graph 950. For example, the processor 701 may identify that the electronic device 101 is in state 909 based on identifying that the first value is greater than or equal to the second value and the first value is greater than or equal to the reference value 952, such as at timing 959 in graph 950.

The operation(s) used in the electronic device 101 to identify whether the electronic device 101 is in the state 901, in the state 903, in the state 905, or in the state 907 may be replaced with another operation. For example, the processor 701 may identify whether the electronic device 101 is in state 901, in state 903, in state 905, or in state 907 by comparing the first value and the second value and comparing the difference between the first value and the second value and the reference value, instead of identifying whether the greater of the first value and the second value is greater than or equal to a reference value as described above.

The processor 701 may enable both the first antenna 711 and the second antenna 722 while identifying that the electronic device 101 is in state 901. For example, activating the first antenna 711 may mean switching the state of the first antenna 711 to a state capable of transmitting or receiving a signal and activating the second antenna 722 may mean switching the state of the second antenna 722 to a state capable of transmitting or receiving a signal. For example, activating the first antenna 711 may mean connecting the first antenna 711 with the RFIC (e.g., the first RFIC 1010) and activating the second antenna 722 may mean connecting the second antenna 722 with the RFIC (e.g., the second RFIC 1020). However, it is not limited thereto. For example, the processor 701 may communicate with the base station 810 through at least one of the beam formed using the first antenna 711 or the beam formed using the second antenna 722, while identifying that the electronic device 101 is in state 901. For example, referring to FIG. 9C, the processor 701 may communicate with the base station 810 through at least one of the beam 982 formed using the first antenna 711 or the beam 983 formed using the second antenna 722, as shown in state 981. For example, the processor 701 may communicate with the base station 810 through the beam 982 corresponding to the relative positional relationship between the electronic device 101 and the base station 810.

The processor 701 may activate both the first antenna 711 and the second antenna 722 while identifying that the electronic device 101 is in state 903. For example, the processor 701 may communicate with the base station 810 through at least one of the beam formed using the first antenna 711 or the beam formed using the second antenna 722, while identifying that the electronic device 101 is in state 903. For example, referring to FIG. 9C, the processor 701 may communicate with the base station 810 through at least one of the beam 982 formed using the first antenna 711 or the beam 983 formed using the second antenna 722, as shown in state 981. For example, the processor 701 may communicate with the base station 810 through the beam 983 corresponding to the relative positional relationship between the electronic device 101 and the base station 810.

The processor 701 may activate the second antenna 722 of the first antenna 711 and the second antenna 722 while identifying that the electronic device 101 is in state 905. For example, while identifying that the electronic device 101 is in state 905, the processor 701 may communicate with the base station 810 through a beam formed using the second antenna 722. In an embodiment, since the second value, while exceeding the first value in the state 905, is less than the reference value 952, the processor 701 may activate the second antenna 722 and the fourth antenna 724 among the first antenna 711, the second antenna 722, the third antenna 713, and the fourth antenna 724. For example, while identifying that the electronic device 101 is in state 905, the processor 701 may communicate with the base station 810 through at least one beam formed using the second antenna 722 and the fourth antenna 724. For example, referring to FIG. 9C, the processor 701 may communicate with the base station 810 through at least one beam 985 formed using the second antenna 722 and the fourth antenna 724, as shown in state 984.

The processor 701 may activate the first antenna 711 from among the first antenna 711 and the second antenna 722 while identifying that the electronic device 101 is in state 907. For example, while identifying that the electronic device 101 is in state 907, the processor 701 may communicate with the base station 820 which is a neighboring base station of the base station 810 by using a beam formed using the first antenna 711. For example, referring to FIG. 9B, since the time interval 961 between the timing 955 and the timing 957 comprises a time interval 962 in which the first value is changed to exceed the second value, the processor 701 may perform handover from the base station 810 to the base station 820 by establishing a connection with the base station 820 within the time interval 961 (or the time interval 962) and releasing the connection with the base station 810. The processor 701 may communicate with the base station 820 through a beam formed using the first antenna 711 in the state 907 while being connected to the base station 820.

In an embodiment, since the first value exceeding the second value in state 907 is less than the reference value 952, the processor 701 may activate the first antenna 711 and the third antenna 713 among the first antenna 711, the second antenna 722, the third antenna 713, and the fourth antenna 724. For example, the processor 701 may communicate with the base station 810 through at least one beam formed using the first antenna 711 and the third antenna 713, while identifying that the electronic device 101 is in state 907. For example, referring to FIG. 9C, the processor 701 may communicate with the base station 810 through at least one beam 987 formed using the first antenna 711 and the third antenna 713, as shown in state 986.

The processor 701 may activate both the first antenna 711 and the second antenna 722 while identifying that the electronic device 101 is in state 909. For example, the processor 701 may communicate with the base station 820 through at least one of the beam formed using the first antenna 711 or the beam formed using the second antenna 722, while identifying that the electronic device 101 is in state 909. For example, referring to FIG. 9C, the processor 701 may communicate with the base station 820 through at least one of the beam 982 formed using the first antenna 711 or the beam 983 formed using the second antenna 722, as shown in state 981. For example, the processor 701 may communicate with the base station 820 through the beam 982 corresponding to the relative positional relationship between the electronic device 101 and the base station 820.

Meanwhile, the electronic device 101 may comprise at least one switch connected with the first antenna 711, the second antenna 722, the third antenna 713, or the fourth antenna 724 to activate at least one of the first antenna 711, the second antenna 722, and the fourth antenna 724. For example, referring to FIG. 10, the electronic device 101 may further comprise a first RFIC 1010 that may be connected to one of the first antenna 711 and the fourth antenna 724 through a first switch 1031 and the second RFIC 1020 that may be connected to one of the second antenna 722 and the third antenna 713 through the second switch 1032.

For example, the first switch 1031 may be controlled by the processor 701 based on the state of the electronic device 101, and the second switch 1032 may be controlled by the processor 701 based on the state of the electronic device 101. According to embodiments, the first switch 1031 may be included in the first RFFE 1041, and the second switch 1032 may be included in the second RFFE 1051.

For example, the first RFIC 1010 may down-convert a signal received through at least one of the first antenna 711 or the fourth antenna 724, provide the down-converted signal to the processor 701 or up-convert the signal obtained from the processor 701, and transmit the up-converted signal through at least one of the first antenna 711 and the fourth antenna 724. For example, the second RFIC 1020 may down-convert a signal received through at least one of the second antenna 722 or the third antenna 713, provide the down-converted signal to the processor 701 or up-convert the signal obtained from the processor 701 and transmit the up-converted signal through at least one of the second antenna 722 or the third antenna 713. For example, each of the first RFIC 1010 and the second RFIC 1020 may comprise at least one of the third RFIC 226 illustrated in FIG. 2 or 4 or the fourth RFIC 228 illustrated in FIG. 4.

The processor 701 may activate at least one of the first antenna 711, the second antenna 722, the third antenna 713, and the fourth antenna 724 by controlling the first switch 1031 and the second switch 1032, respectively.

For example, the processor 701 may activate the first antenna 711 and the second antenna 722 in the state 901, the state 903, and the state 909, by controlling the first switch 1031 to connect the first RFIC 1010 with the first antenna 711 and controlling the second switch 1032 to connect the second RFIC 1020 with the second antenna 722.

For example, in state 905, the processor 701 may activate the second antenna 722 and the fourth antenna 724, by controlling the first switch 1031 to connect the first RFIC 1010 with the fourth antenna 724 and controlling the second switch 1032 to connect the second RFIC 1020 with the second antenna 722.

For example, in the state 907, the processor 701 may control the first switch 1031 to connect the first RFIC 1010 with the first antenna 711, and the second switch 1032 to connect the second RFIC 1020 with the third antenna 713.

Meanwhile, the electronic device 101 may further comprise a first radio frequency front end (RFFE) 1041 operatively coupled to the first RFIC 1010, comprising a transmission chain (Tx chain) 1042 connectable to one of the first antenna 711 and the fourth antenna 724 through the first switch 1031 and a reception chain (Rx chain) 1043 connectable to one of the first antenna 711 and the fourth antenna 724 through the first switch 1031, a second RFFE 1051 operatively coupled to the second RFIC 1020, comprising a Tx chain 1052 connectable to one of the second antenna 722 and the third antenna 713 through the second switch 1032 and a Rx chain 1053 connectable to one of the second antenna 722 and the third antenna 713 through the second switch 1032. For example, the first RFFE 1041 may comprise at least one filter, at least one power amplifier (PA), a switch, or a duplexer, for processing a signal transmitted through the first antenna 711 and/or the fourth antenna 724 or a signal received through the first antenna 711 and/or the fourth antenna 724. For example, the second RFFE 1051 may comprise at least one filter, at least one power amplifier (PA), a switch, or a duplexer, for processing a signal transmitted through the second antenna 722 and/or the third antenna 713 or a signal received through the second antenna 722 and/or the third antenna 713. However, it is not limited thereto.

The processor 701 may connect one of the Tx chain 1042 and the Rx chain 1043 with one of the first antenna 711 and the fourth antenna 724 through the first switch 1031. The processor 701 may connect one of the Tx chain 1051 and the Rx chain 1502 with one of the second antenna 722 and the third antenna 713 through the second switch 1032.

For example, on a condition that signals are transmitted in each of the state 901, the state 903, and the state 909, the processor 701 may connect the first RFIC 1010 to the first antenna 711 through the Tx chain 1042, and the second RFIC 1020 to the second antenna 722 through the Tx chain 1052, by setting the state of the first switch 1031 to the state 1071, and setting the state of the second switch 1032 to the state 1081. In state 901, state 903, and state 909, the processor 701 may transmit a signal through at least one of the beam formed using the first antenna 711 connected to the first RFIC 1010 through the Tx chain 1042 or the beam formed using the second antenna 722 connected to the second RFIC 1020 through the Tx chain 1052.

For example, on a condition that receiving a signal in each of the state 901, the state 903, and the state 909, the processor 701 may connect the first RFIC 1010 to the first antenna 711 through the Rx chain 1043, and the second RFIC 1020 to the second antenna 722 through the Rx chain 1053, by setting the state of the first switch 1031 to the state 1072, and setting the state of the second switch 1032 to the state 1082. In the state 901, the state 903, and the state 909, the processor 701 may receive a signal through at least one of the beam formed using the first antenna 711 connected to the first RFIC 1010 through the Rx chain 1043 or the beam formed using the second antenna 722 connected to the second RFIC 1020 through the Rx chain 1053.

For example, on a condition that transmitting a signal in state 905, the processor 701 may connect the first RFIC 1010 to the fourth antenna 724 through the Tx chain 1042, and the second RFIC 1020 to the second antenna 722 through the Tx chain 1052, by setting the state of the first switch 1031 to the state 1073 and setting the state of the second switch 1032 to the state 1081. In state 905, the processor 701 may transmit a signal through at least one beam formed using the fourth antenna 724 connected to the first RFIC 1010 through the Tx chain 1042 and the second antenna 722 connected to the second RFIC 1020 through the Tx chain 1052.

For example, on a condition that receiving a signal in state 905, the processor 701 may connect the first RFIC 1010 to the fourth antenna 724 through the Rx chain 1043, and the second RFIC 1020 to the second antenna 722 through the Rx chain 1053, by setting the state of the first switch 1031 to the state 1074 and setting the state of the second switch 1032 to the state 1082. In state 905, the processor 701 may receive a signal through at least one beam formed using the fourth antenna 724 connected to the first RFIC 1010 through the Rx chain 1043 and the second antenna 722 connected to the second RFIC 1020 through the Rx chain 1053.

For example, on a condition that transmitting a signal in state 907, the processor 701 may connect the first RFIC 1010 to the first antenna 711 through the Tx chain 1042, and the second RFIC 1020 to the third antenna 713 through the Tx chain 1052, by setting the state of the first switch 1031 to the state 1071 and setting the state of the second switch 1032 to the state 1083. The processor 701 may transmit a signal through at least one beam formed using the first antenna 711 connected to the first RFIC 1010 through the Tx chain 1042 and the third antenna 713 connected to the second RFIC 1020 through the Tx chain 1052.

For example, on a condition that receiving a signal in state 907, the processor 701 may connect the first RFIC 1010 to the first antenna 711 through the Rx chain 1043, and the second RFIC 1020 to the third antenna 713 through the Rx chain 1053, by setting the state of the first switch 1031 to the state 1072 and setting the state of the second switch 1032 to the state 1084. The processor 701 may receive a signal through at least one beam formed using the first antenna 711 connected to the first RFIC 1010 through the Rx chain 1043 and the third antenna 713 connected to the second RFIC 1020 through the Rx chain 1053.

As mentioned above, when a signal having quality equal to or greater than a reference value (e.g., the reference value 952) is present in signals received through the first antenna 711 facing the first direction and the second antenna 722 facing the second direction, the electronic device 101 may prevent sharp decrease in communication quality that may be caused while the electronic device 101 is moving at high speed, by activating both the first antenna 711 and the second antenna 722.

Figure 11:
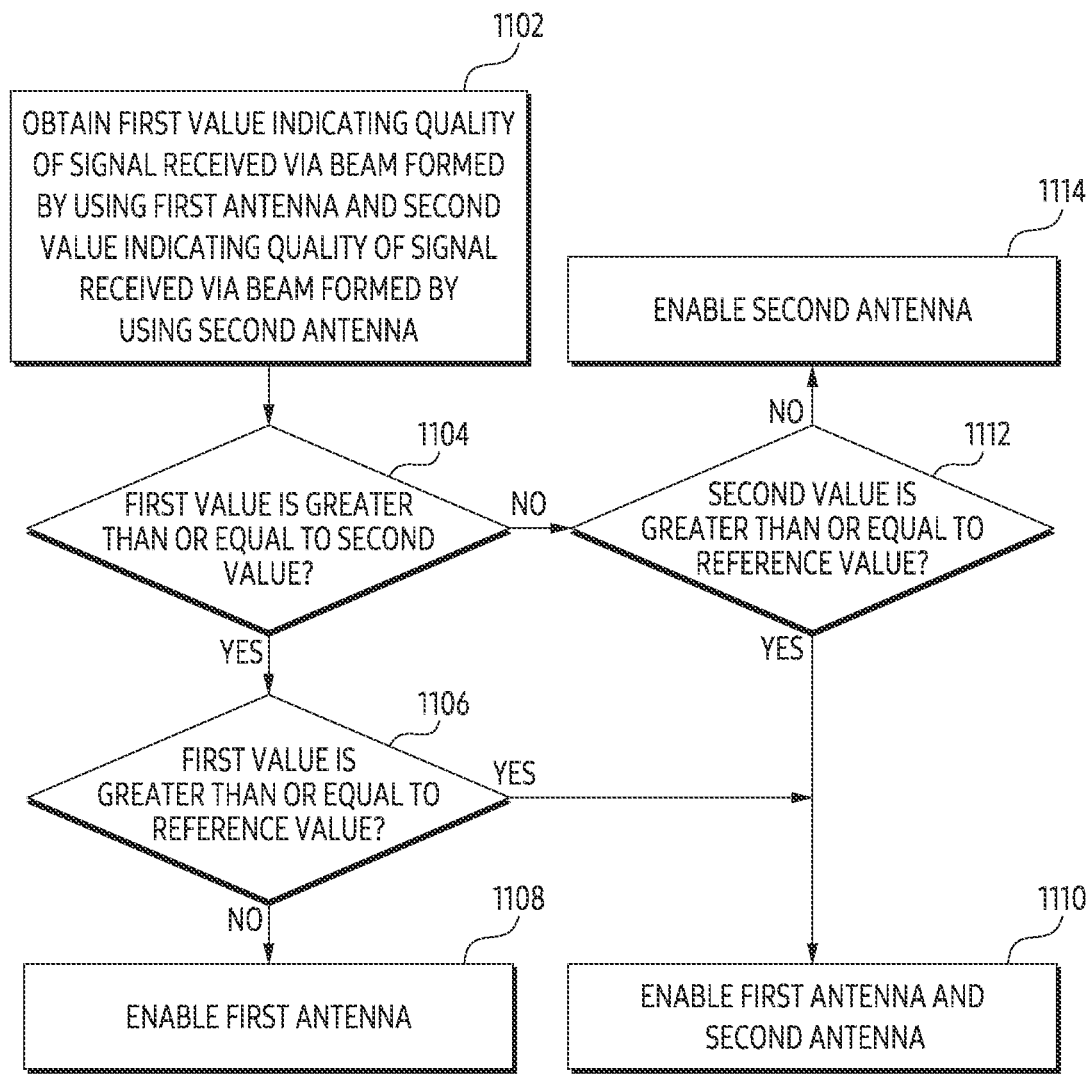
FIG. 11 is a flowchart illustrating a method of enabling at least one of a plurality of antennas according to an embodiment.

FIG. 11 is a flowchart illustrating a method of activating at least one of a plurality of antennas according to an embodiment. The method may be executed by one of the electronic device 101 illustrated in FIG. 1, the electronic device 101 illustrated in FIG. 7, the processor 120 illustrated in FIG. 1, or the processor 701 illustrated in FIG. 7.

Referring to FIG. 11, in operation 1102, The processor 701 may obtain a first value indicating the quality of a signal received through the beam formed using the first antenna 711 facing the first direction and a second value indicating the quality of a signal received through the beam formed using the second antenna 722 facing the second direction different from the first direction. For example, the second direction may be opposite to the first direction. For example, the first antenna 711 and the second antenna 722 may face different directions to expand coverage of the electronic device 101. For example, receiving the signal through the beam formed using the first antenna 711 may comprise receiving the signal through the first antenna 711 using a spatial domain reception filter and receiving the signal through the beam formed using the second antenna 722 may comprise receiving the signal through the second antenna 722 using a spatial domain reception filter. For example, the signal received through the first antenna 711 may be a reference signal received from an external electronic device such as a base station, and the signal received through the second antenna 722 may be a reference signal received from an external electronic device such as a base station. For example, the first value may be a value indicating the state of a channel between the external electronic device and the electronic device 101 when communicating with the external electronic device using the first antenna 711. For example, the first value may be a value indicating the state of a channel related to the first direction facing the first antenna 711. For example, the first value may be received signal strength (RSS), reference signal received power (RSRP), received signal strength indicator (RSSI), reference signal received quality (RSRQ), signal to interference noise ratio (SINR), or channel quality indicator (CQI). However, it is not limited thereto. For example, the second value may be a value indicating the state of a channel between the external electronic device and the electronic device 101 when communicating with the external electronic device using the second antenna 722. For example, the second value may be a value indicating the state of a channel related to the second direction facing the second antenna 722. For example, the second value may be received signal strength (RSS), reference signal received power (RSRP), received signal strength indicator (RSSI), reference signal received quality (RSRQ), signal to interference noise ratio (SINR), or channel quality indicator (CQI). However, it is not limited thereto.

In operation 1104, the processor 701 may identify whether the first value is equal to or greater than the second value. For example, the processor 701 may compare the first value with the second value in order to compare the state of a channel when communicating using the first antenna 711 and the state of a channel when communicating using the second antenna 722. The processor 701 may execute operation 1106 on a condition that the first value is equal to or greater than the second value and may execute operation 1112 on a condition that the first value is less than the second value.

In operation 1106, processor 701 may identify whether the first value is equal to or greater than a reference value based on identifying that the first value is equal to or greater than the second value. For example, the processor 701 may identify whether the first value is equal to or greater than the reference value in order to identify whether the state of the electronic device 101 is state 901 (also state 909) or state 907. For example, the reference value may be a parameter defined in the electronic device 101 to identify whether the gain of the antenna of the electronic device 101 is required to be enhanced. The processor 701 may execute operation 1110 on a condition that the first value is equal to or greater than the reference value and may execute operation 1108 on a condition that the first value is less than the reference value.

In operation 1108, the processor 701 may activate the first antenna 711 from among the first antenna 711 and the second antenna 722 based on identifying that the first value is less than the reference value. For example, since the fact that the first value is less than the reference value may mean that the gain of the antenna of the electronic device 101 is required to be enhanced, the processor 701 may further activate the third antenna 713 facing the first direction from among the third antenna 713 and the fourth antenna 724. For example, "activating the first antenna 711" may also include the operation of activating an antenna in the same direction as the first antenna 711, such as the third antenna 713. For example, the processor 701 may communicate with an external electronic device (e.g., base station) through at least one beam formed using the first antenna 711 and the third antenna 713. For example, the processor 701 may communicate with the external electronic device through the first antenna 711 and the third antenna 713 using a spatial domain transmission filter and/or a spatial domain reception filter.

In operation 1110, the processor 701 may activate both the first antenna 711 and the second antenna 722 based on identifying that the first value is equal to or greater than the reference value. For example, the processor 701 may activate both the first antenna 711 and the second antenna 722 in order to prevent the communication quality with the external electronic device from rapidly decreasing on a condition that the state 901 of the electronic device 101 transitions to the state 903. For example, the fact that the first value is greater than or equal to the reference value means that the quality of the communication may be guaranteed, even when performing communication with an external electronic device using one of the first antenna 711 and the third antenna 713 facing the first direction (e.g., the first antenna 711), the processor 701 may activate the first antenna 711 and the second antenna 722 to prevent sharp decrease in communication quality with the external electronic device caused by moving from the state 901 to the state 903. For example, the processor 701 may communicate with the external electronic device through at least one of the beam formed using the first antenna 711 or the beam formed using the second antenna 722. For example, the processor 701 may communicate with the external electronic device through at least one of the first antenna 711 and the second antenna 722 using a spatial domain transmission filter and/or a spatial domain reception filter.

In operation 1112, processor 701 may identify whether the second value is equal to or greater than the reference value based on identifying that the first value is less than the second value. For example, the processor 701 may identify whether the second value is equal to or greater than the reference value in order to identify whether the state of the electronic device 101 is the state 903 or the state 905. The processor 701 may execute operation 1110 on a condition that the second value is equal to or greater than the reference value and may execute operation 1114 on a condition that the second value is less than the reference value.

In operation 1110, the processor 701 may activate both the first antenna 711 and the second antenna 722 based on identifying that the second value is equal to or greater than the reference value. For example, the processor 701 may activate both the first antenna 711 and the second antenna 722 in order to prevent the communication quality with the external electronic device from rapidly decrease on a condition that the state 903 of the electronic device 101 transitions to the state 901. For example, the fact that the second value is greater than or equal to the reference value means that the quality of the communication may be guaranteed even when performing communication with an external electronic device using one of the second antenna 722 and the fourth antenna 724 facing the second direction (e.g., the second antenna 722), the processor 701 may activate the first antenna 711 and the second antenna 722 in order to prevent sharp decrease in communication quality with the external electronic device caused by moving from the state 903 to the state 901. For example, the processor 701 may communicate with the external electronic device through at least one of the beam formed using the first antenna 711 or the beam formed using the second antenna 722. For example, the processor 701 may communicate with the external electronic device through at least one of the first antenna 711 and the second antenna 722 using a spatial domain transmission filter and/or a spatial domain reception filter.

In operation 1114, the processor 701 may activate the second antenna 722 from among the first antenna 711 and the second antenna 722 based on identifying that the second value is less than the reference value. For example, the fact that the second value is less than the reference value may mean that the gain of the antenna of the electronic device 101 is required to be enhanced, the processor 701 may further activate the fourth antenna 724 facing the second direction among the third antenna 713 and the fourth antenna 724. For example, "activating the second antenna 722" may also include the operation of activating an antenna in the same direction as the second antenna 722, such as the fourth antenna 724. For example, the processor 701 may communicate with an external electronic device (e.g., base station) through at least one beam formed using the second antenna 722 and the fourth antenna 724. For example, the processor 701 may communicate with the external electronic device through the second antenna 722 and the fourth antenna 724 using a spatial domain transmission filter and/or a spatial domain reception filter.

FIG. 11 illustrates identifying whether the state of the electronic device 101 is state 901, state 903, state 905, or state 907 through operations 1104, 1106, and 1112, but it should be noted that operation 1104, operation 1106, and operation 1112 may be replaced with other operations for identifying whether the state of the electronic device 101 is state 901, state 903, state 905, or state 907. In other words, although FIG. 11 illustrates that the electronic device 101 activates antennas facing different directions in states 901 and 903 and activates antennas facing one direction in each of states 905 and 907, operations of the electronic device 101 are not limited to operations of FIG. 11.

As described above, the electronic device 101 may maintain the quality of communication between the electronic device 101 and at least one external electronic device while the electronic device 101 is moving at high speed by executing the operations illustrated through the descriptions of FIG. 11.

Figure 12:
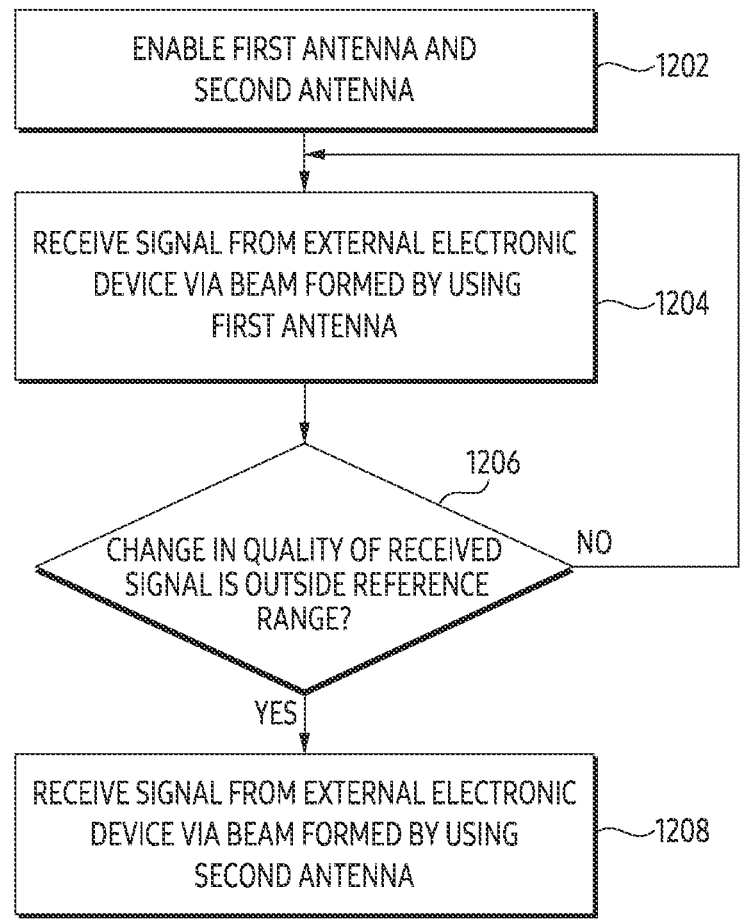
FIG. 12 is a flowchart illustrating a method of controlling the antennas while enabling antennas facing different directions according to an embodiment.

FIG. 12 is a flowchart illustrating a method of controlling the antennas while enabling antennas facing different directions according to an embodiment. The method may be executed by one of the electronic device 101 illustrated in FIG. 1, the electronic device 101 illustrated in FIG. 7, the processor 120 illustrated in FIG. 1, and the processor 701 illustrated in FIG. 7.

Referring to FIG. 12, in operation 1202, the processor 701 may activate the first antenna 711 and the second antenna 722. For example, the processor 701 may execute operation 1202 based on identifying that the first reference value is equal to or greater than the second value and is equal to or greater than the reference value in operation 1106.

In operation 1204, the processor 701 may receive a signal from an external electronic device through a beam formed using the first antenna 711 among the first antenna 711 and the second antenna 722. For example, since the first value is identified as equal to or greater than the second value in operation 1106, the signal may be received from the external electronic device through a beam formed using the first antenna 711 among the first antenna 711 and the second antenna 722 activated in operation 1202. For example, the processor 701 may receive the signal from the external electronic device through the first antenna 711 using a spatial domain reception filter. For example, the signal may be at least one of a reference signal, a signal comprising control information, or a signal comprising user data.

In operation 1206, while receiving the signal through the first antenna 711, the processor 701 may identify whether change in the quality of the received signal is outside a reference range. For example, in order to identify whether the state 901 of the electronic device 101 transitions to the state 903, processor 701 may identify whether change in the quality of the received signal is outside the reference range. The processor 701 may maintain receiving the signal through the first antenna 711 by executing operation 1204 again on a condition that the change is within the reference range. The processor 701 may execute operation 1208 on a condition that the change is outside the reference range.

In operation 1208, processor 701 may receive a signal from the external electronic device through a beam formed using the second antenna 722 among the first antenna 711 and the second antenna 722 based on identifying that the change is outside the reference range. For example, since the change being outside the reference range may mean that the second value is greater than or equal to the reference value and is greater than the first value, the processor 701 may cease receiving the signal from the external electronic device through the beam formed using the first antenna 711 and may receive the signal from the external electronic device through a beam formed using the second antenna 722. For example, the processor 701 may receive the signal from the external electronic device through the second antenna 722 using a spatial domain reception filter.

As described above, in order to prevent sharp decrease in communication quality due to transitioning from the state 901 (or state 909) to the state 903, the electronic device 101 may activate the first antenna 711 facing the first direction and the second antenna 722 facing the second direction and communicate with the external electronic device through a beam formed using the first antenna 711 facing a direction corresponding to the relative positional relationship between the electronic device 101 and the external electronic device among the first antenna 711 and the second antenna 722. The electronic device 101 may maintain the quality of communication with the external electronic device while the electronic device 101 is moving at high speed, by performing communication with the external electronic device through a beam formed using an activated second antenna 722, based on identifying transition from state 901 to state 903 while performing the communication.

Figure 13:
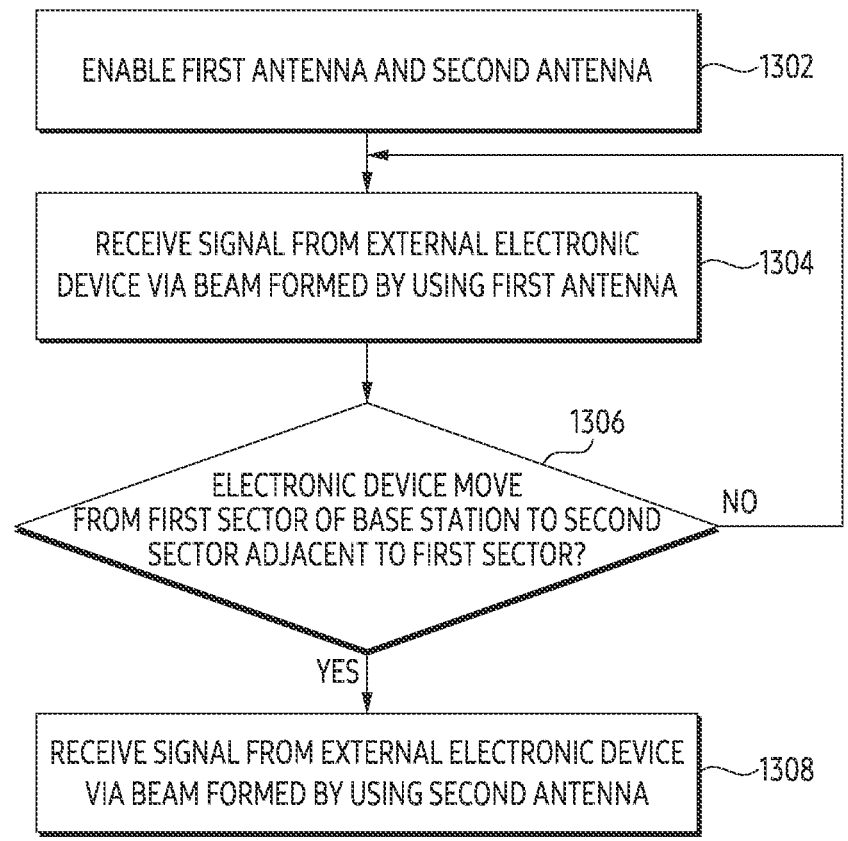
FIG. 13 is a flowchart illustrating another method of controlling the antennas while enabling antennas facing different directions according to an embodiment.

FIG. 13 is a flowchart illustrating another method of controlling the antennas while activating antennas facing different directions according to an embodiment. The method may be executed by one of the electronic device 101 illustrated in FIG. 1, the electronic device 101 illustrated in FIG. 7, the processor 120 illustrated in FIG. 1, and the processor 701 illustrated in FIG. 7.

Referring to FIG. 13, in operation 1302, the processor 701 may activate the first antenna 711 and the second antenna 722. For example, operation 1302 may correspond to operation 1202 of FIG. 12.

In operation 1304, the processor 701 may receive a signal from the base station through a beam formed using the first antenna 711 among the first antenna 711 and the second antenna 722. For example, operation 1304 may correspond to operation 1204 of FIG. 12.

In operation 1306, while receiving the signal from the base station through the first antenna 711, the processor 701 may identify whether the electronic device 101 is moved from the first sector of the base station to the second sector of the base station adjacent to the first sector. For example, since the electronic device 101 may be in the first sector of the base station 810 in state 901, and in the second sector of the base station 810 in state 903, the processor 120 may identify whether the electronic device 101 is moved from the first sector to the second sector to identify the transition from the state 901 to the state 903. For example, when the frequency band provided in the first sector and the frequency band provided in the second sector are different from each other, the processor 701 may identify movement from the first sector to the second sector based on a change in the frequency band. In another example, processor 701 may identify movement from the first sector to the second sector based on the quality of the signal received in relation to the first sector and the quality of the signal received in relation to the second sector. For another example, processor 701 may identify movement from the first sector to the second sector, based on the location of the electronic device 101 obtained through a global navigation satellite system (GNSS) receiver included in the electronic device 101, and the location of the base station previously stored in the electronic device 101. For another example, the processor 701 may identify movement from the first sector to the second sector based on a change in an offset of a signal received from the base station. However, it is not limited thereto. The processor 701 may maintain receiving the signal through the first antenna 711 by re-executing operation 1304 on a condition that the electronic device 101 is not moved from the first sector to the second sector. The processor 701 may execute operation 1308 on a condition that the electronic device 101 moves from the first sector to the second sector.

In operation 1308, the processor 701 may receive a signal from the external electronic device through a beam formed using the second antenna 722 based on identifying that the electronic device 101 is moved from the first sector to the second sector. For example, since the positional relationship between the electronic device 101 located in the second sector and the base station corresponds to the second direction facing the second antenna 722, the processor 701 may cease receiving the signal from the external electronic device through the beam formed using the first antenna 711 and may receive the signal from the external electronic device through the beam formed using the second antenna 722. For example, the processor 701 may receive the signal from the external electronic device through the second antenna 722 using a spatial domain reception filter.

As described above, the electronic device 101 may identify the transition from the state 910 to the state 903 by identifying whether the electronic device 101 is moved to another sector of the base station. Through this identification, the electronic device 101 may maintain the quality of communication with the base station while the electronic device 101 is moving at high speed.

Figure 14:
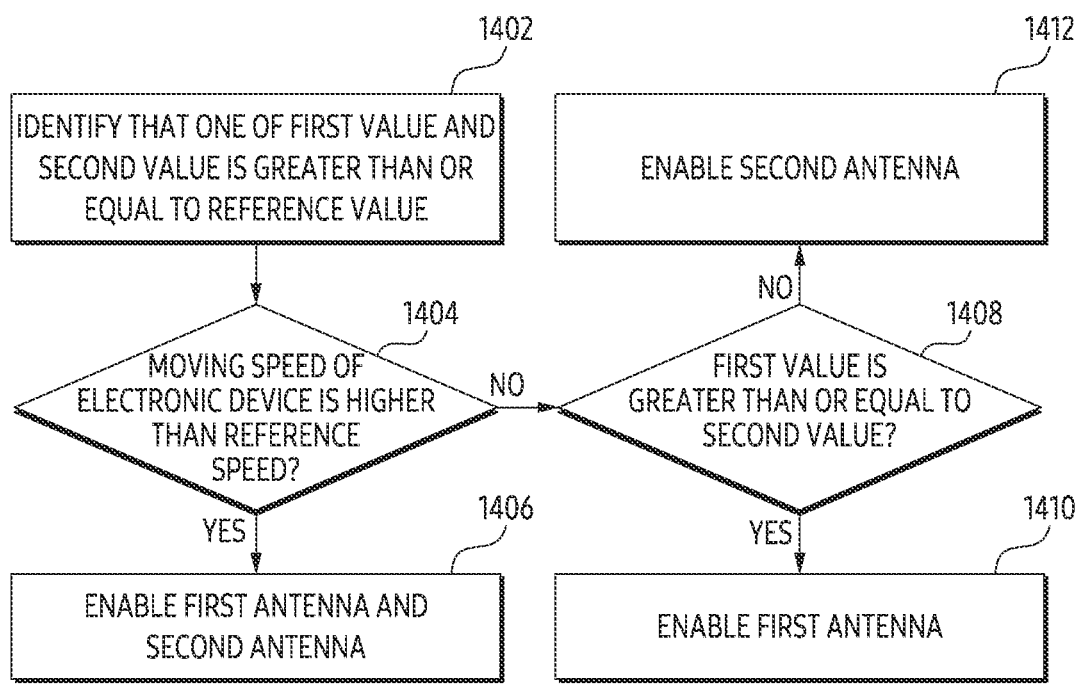
FIG. 14 is a flowchart illustrating a method of controlling antennas based on moving speed of an electronic device according to an embodiment.

FIG. 14 is a flowchart illustrating a method of controlling antennas based on moving speed of an electronic device according to an embodiment. The method may be executed by one of the electronic device 101 illustrated in FIG. 1, the electronic device 101 illustrated in FIG. 7, the processor 120 illustrated in FIG. 1, and the processor 701 illustrated in FIG. 7.

Referring to FIG. 14, in operation 1402, the processor 701 may identify that one of the first value and the second value is equal to or greater than the reference value. For example, the processor 701 may identify that the first value is equal to or greater than the second value and is equal to or greater than the reference value or that the second value exceeding the first value is equal to or greater than the reference value.

In operation 1404, processor 701 may identify whether the moving speed of electronic device 101 is equal to or greater than a reference speed based on identifying that one of the first value and the second value is equal to or greater than the reference value. For example, data on the moving speed may be obtained through at least one of an acceleration sensor of the electronic device 101 or a global navigation satellite system (GNSS) receiver of the electronic device 101. For example, the reference speed may be a parameter defined in the electronic device 101 to identify whether the quality of communication between the electronic device 101 and the external electronic device would rapidly decrease when the state 901 transitions to the state 903. The processor 701 may execute operation 1406 on a condition that the moving speed is equal to or greater than the reference speed and may execute operation 1408 on a condition that the moving speed is less than the reference speed.

In operation 1406, the processor 701 may activate the first antenna 711 and the second antenna 722 based on identifying that the moving speed is equal to or greater than the reference speed. For example, the fact that the moving speed is greater than or equal to the reference speed may mean that the electronic device 101 is in an environment in which there is insufficient time for beam training, the processor 701 may activate the first antenna 711 and the second antenna 722, based on identifying that the moving speed is equal to or greater than the reference speed, in order to prevent communication quality from rapidly decreasing due to the transition from the state 901 to the state 903.

In operation 1408, processor 701 may identify whether the first value is equal to or greater than the second value based on identifying that the moving speed is less than the reference speed. The processor 701 may execute operation 1410 on a condition that the first value is equal to or greater than the second value and may execute operation 1412 on a condition that the first value is less than the second value.

In operation 1410, the processor 701 may activate the first antenna 711 from among the first antenna 711 and the second antenna 722 based on identifying that the first value is equal to or greater than the second value. For example, the fact that the moving speed is less than the reference speed may mean that the electronic device 101 is in an environment in which there can be sufficient time for beam training and the fact that the first value is equal to or greater than the second value may mean that the direction toward the first antenna 711 among the first antenna 711 and the second antenna 722 corresponds to the relative positional relationship between the electronic device 101 and the external electronic device, the processor 701 may activate the first antenna 711 from among the first antenna 711 and the second antenna 722. For example, the processor 701 may activate the first antenna 711 from among the first antenna 711 and the second antenna 722 instead of activating both the first antenna 711 and the second antenna 722 in the state 901 (or state 909).

In operation 1412, the processor 701 may activate the second antenna 722 from among the first antenna 711 and the second antenna 722 based on identifying that the first value is less than the second value. For example, the fact that the moving speed is less than the reference speed may mean that the electronic device 101 is in an environment in which there can be sufficient time for beam training and the fact that the first value is less than the second value means that the direction facing the second antenna 722 among the first antenna 711 and the second antenna 722 corresponds to the relative positional relationship between the electronic device 101 and the external electronic device, the processor 701 may activate the second antenna 722 from among the first antenna 711 and the second antenna 722. For example, the processor 701 may activate the second antenna 722 among the first antenna 711 and the second antenna 722 instead of activating both the first antenna 711 and the second antenna 722 in state 903.

As described above, the electronic device 101 may adaptively execute control of the antennas of the electronic device 101 in the transition from state 901 to state 903 based on the moving speed of the electronic device 101. Through such adaptive execution, the electronic device 101 may provide enhanced communication quality.

Figure 15:
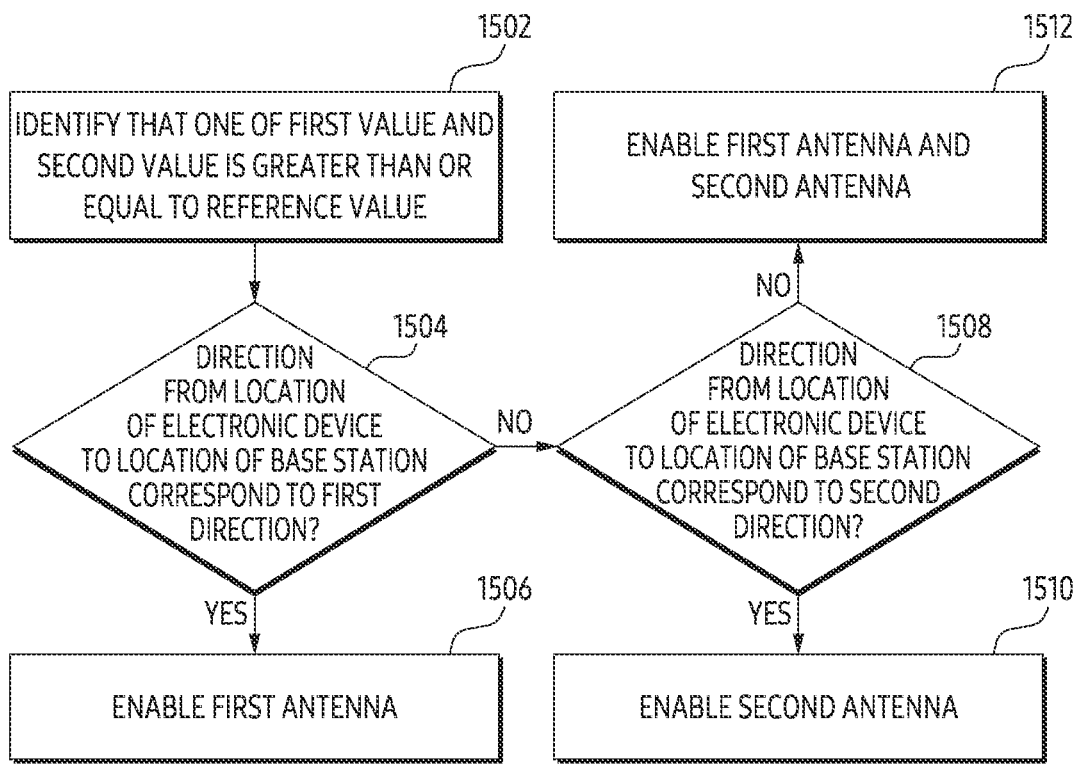
FIG. 15 is a flowchart illustrating a method of controlling antennas based on a position of an electronic device according to an embodiment.

FIG. 15 is a flowchart illustrating a method of controlling antennas based on a position of an electronic device according to an embodiment. The method may be executed by one of the electronic device 101 illustrated in FIG. 1, the electronic device 101 illustrated in FIG. 7, the processor 120 illustrated in FIG. 1, and the processor 701 illustrated in FIG. 7.

Referring to FIG. 15, in operation 1502, the processor 701 may identify that one of the first value and the second value is equal to or greater than the reference value. For example, operation 1502 may correspond to operation 1402 of FIG. 14.

In operation 1504, the processor 701 may identify whether the direction from the position of the electronic device 101 to the position of the base station corresponds to the first direction facing the first antenna 711. For example, the processor 701 may obtain data on the location of the electronic device 101 through a global navigation satellite system (GNSS) receiver of the electronic device 101. The processor 701 may identify the direction based on the location of the electronic device 101 and the location of the base station previously stored in the electronic device 101 and identify whether the direction corresponds to the first direction facing the first antenna 711. The fact that the direction corresponds to the first direction may mean that the direction of at least one of the beams that may be formed using the first antenna 711 corresponds to the direction. However, it is not limited thereto. The processor 701 may execute operation 1506 on a condition that the direction corresponds to the first direction and may execute operation 1508 on a condition that the direction does not correspond to the first direction.

In operation 1506, the processor 701 may activate the first antenna 711 from among the first antenna 711 and the second antenna 722 based on identifying that the direction corresponds to the first direction. For example, the processor 701 may activate the first antenna 711 from among the first antenna 711 and the second antenna 722 based on the relative positional relationship between the electronic device 101 and the base station, instead of activating both the first antenna 711 and the second antenna 722.

In operation 1508, processor 701 may identify whether the direction corresponds to the second direction based on identifying that the direction does not correspond to the first direction. The fact that the direction corresponds to the second direction may mean that the direction of at least one of the beams that may be formed using the second antenna 722 corresponds to the direction. However, it is not limited thereto. The processor 701 may execute operation 1510 on a condition in which the direction corresponds to the second direction and operation 1512 on a condition in which the direction does not correspond to the second direction.

In operation 1510, the processor 701 may activate the second antenna 722 from among the first antenna 711 and the second antenna 722 based on identifying that the direction corresponds to the second direction. For example, the processor 701 may activate the second antenna 722 from among the first antenna 711 and the second antenna 722 based on a relative positional relationship between the electronic device 101 and the base station, instead of activating both the first antenna 711 and the second antenna 722.

In operation 1512, the processor 701 may activate the first antenna 711 and the second antenna 722 based on identifying that the direction does not correspond to the second direction. For example, the fact that the direction is different from the first direction and the second direction may mean that the electronic device 101 is in an intermediate state between the states 901 and 903, the processor 701 may activate both the first antenna 711 and the second antenna 722.

As described above, the electronic device 101 may identify whether the electronic device 101 is in state 901, in state 903, or in an intermediate state between state 901 and state 903 using the location of the electronic device 101 and the location of the base station. Through this identification, the electronic device 101 may reduce power consumption by activating both the first antenna 711 and the second antenna 722 in states 901 and 903, respectively.

Figure 16:
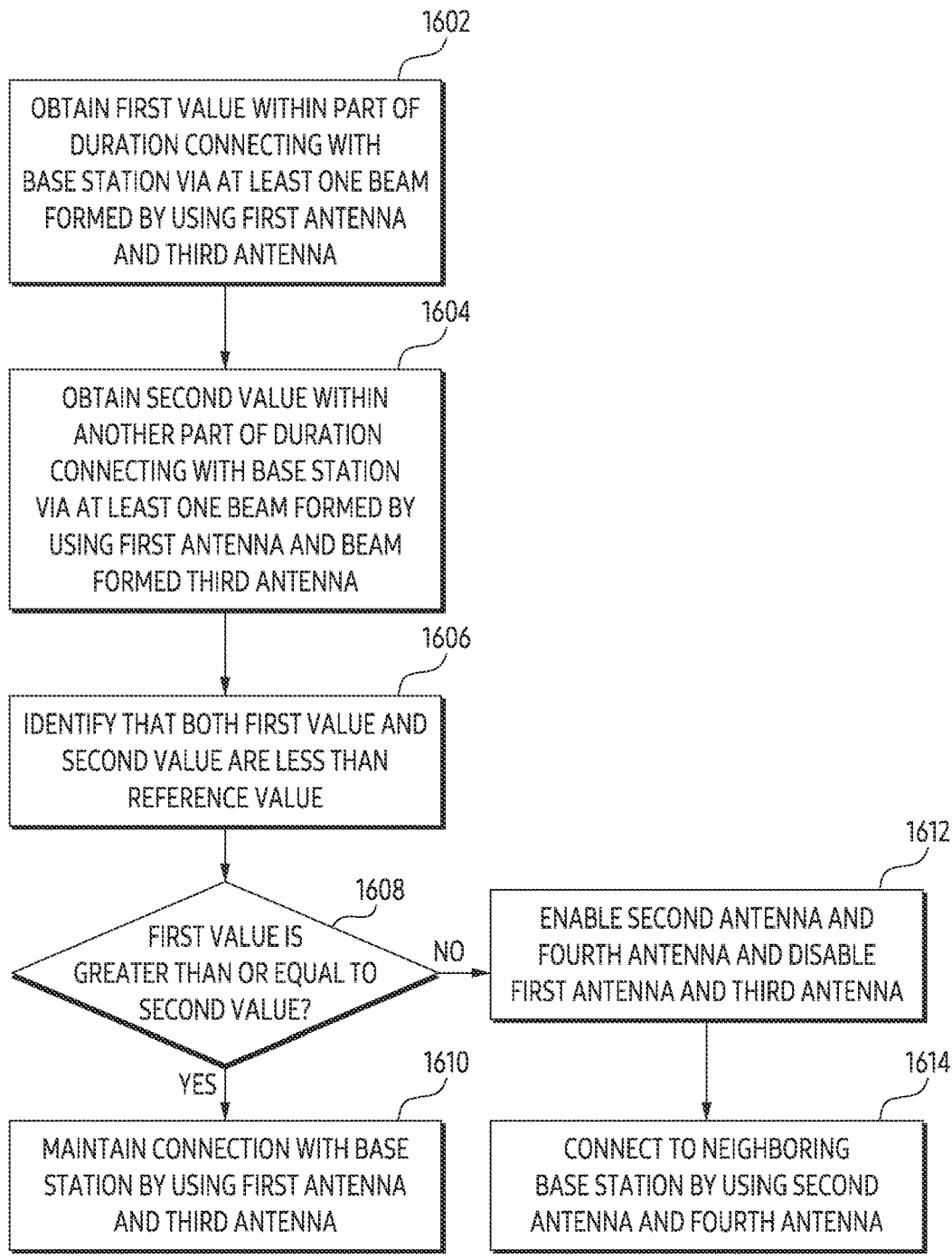
FIG. 16 is a flowchart illustrating a method of performing handover to a neighboring base station according to an embodiment.

FIG. 16 is a flowchart illustrating a method of performing handover to a neighboring base station according to an embodiment. The method may be executed by one of the electronic device 101 illustrated in FIG. 1, the electronic device 101 illustrated in FIG. 7, the processor 120 illustrated in FIG. 1, and the processor 701 illustrated in FIG. 7.

Referring to FIG. 16, in operation 1602, the processor 701 may obtain a first value indicating the quality of a signal received through the at least one beam during a part of a duration connected with a base station via the at least one beam formed using the first antenna 711 and the third antenna 713. For example, the processor 701 may obtain the first value during the part of the duration connected with the base station through the at least one beam formed using the first antenna 711 and the third antenna 713, based on the execution of operation 1108 of FIG. 11.

In operation 1604, the processor 701 may deactivate at least one of the first antenna 711 and the third antenna 713 during another part of the duration connected with the base station via the at least one beam formed using the first antenna 711 and the third antenna 713, enable at least one of the second antenna 722 and the fourth antenna 724, and obtain a second value indicating the quality of a signal received through at least one other beam formed using at least one of the second antenna 722 and the fourth antenna 724. For example, the processor 701 may obtain the second value to identify whether the state 907 is transitioning the state 905.

In operation 1606, the processor 701 may identify that both the first value and the second value are less than the reference value. For example, based on obtaining the first value and the second value, the processor 701 may identify that each of the first value and the second value is less than the reference value by comparing the first value with the reference value and comparing the second value with the reference value.

In operation 1608, processor 701 may identify whether the first value is equal to or greater than the second value based on the identification. On a condition that the first value is equal to or greater than the second value, the processor 701 may execute operation 1610 and on a condition that the first value is less than the second value, the processor 701 may execute operation 1612.

In operation 1610, based on identifying that the first value is equal to or greater than the second value, the processor 701 may maintain connection with the base station using the first antenna 711 and the third antenna 713. For example, the fact that the first value is equal to or greater than the second value may mean that handover from the base station to the neighboring base station is not required, the processor 701 may maintain connection with the base station.

In operation 1612, based on identifying that the first value is less than the second value, the processor 701 may activate the second antenna 722 and the fourth antenna 724 and deactivate the first antenna 711 and the third antenna 713. For example, the fact that the first value is less than the second value may mean that handover from the base station to the neighboring base station is required, the processor 701 may activate the second antenna 722 and the fourth antenna 724 for handover to the neighboring base station. For example, the processor 701 may activate the second antenna 722 and the fourth antenna 724 based on identifying that the state 907 of the electronic device 101 is transitioning to the state 905.

In operation 1614, the processor 701 may be connected to the neighboring base station using the second antenna 722 and the fourth antenna 724 activated in operation 1612. For example, the processor 701 may transmit or receive a signal to or from the neighboring base station through at least one beam formed using the second antenna 722 and the fourth antenna 724. For example, the processor 701 may transmit the signal to the neighboring base station or receive the signal from the neighboring base station through the second antenna 722 and the fourth antenna 724 using a spatial domain transmission filter or a spatial domain reception filter.

As described above, the electronic device 101 may maintain the quality of communication between the electronic device 101 and the external electronic device by performing handover based on identifying that the state of the electronic device 101 is switched from state 905 to state 907 or from state 907 to state 905.

As described above, the electronic device (e.g., electronic device 101) may comprise a first antenna array (e.g., the first antenna array 710) comprising a first antenna (e.g., the first antenna 711) facing a first direction, a second antenna array (e.g., a second antenna array 720) comprising a second antenna (e.g., second antenna 722) facing a second direction, and at least one processor (e.g., processor 701), operably coupled with the first antenna array and the second antenna array, configured to obtain a first value indicating a quality of a signal received via a beam formed by using the first antenna and a second value indicating a quality of a signal received via a beam formed by using the second antenna; based on identifying that a value from among the first value and the second value is greater than or equal to a reference value, enable both the first antenna and the second antenna; based on identifying that the first value less than the reference value is greater than or equal to the second value, enable the first antenna from among the first antenna and the second antenna; and based on identifying that the second value less than the reference value is greater than the first value, enable the second antenna from among the first antenna and the second antenna.

For example, the first antenna array may further comprise a third antenna (e.g., a third antenna 713) facing the first direction, the second antenna array may further comprise a fourth antenna (e.g., a fourth antenna 724) facing the second direction, and the at least one processor may be configured to: based on identifying that a value from among the first value and the second value is greater than or equal to the reference value, enable the first antenna and the second antenna from among the first antenna, the second antenna, the third antenna, and the fourth antenna; based on identifying that the first value less than the reference value is greater than or equal to the second value, enable the first antenna and the third antenna from among the first antenna, the second antenna, the third antenna, and the fourth antenna; and based on identifying that the second value less than the reference value is greater than the first value, enable the second antenna and the fourth antenna from among the first antenna, the second antenna, the third antenna, and the fourth antenna. For example, the at least one processor may be configured to: while identifying that a value from among the first value and the second value is greater than or equal to the reference value, communicate, with an external electronic device, via at least one of a beam formed by using the enabled first antenna and a beam formed by using the enabled second antenna; while identifying that the first value less than the reference value is greater than or equal to the second value, communicate, with the external electronic device, via at least one beam formed by using the enabled first antenna and the enabled third antenna; and while identifying that the second value less than the reference value is greater than the first value, communicate, with the external electronic device, via at least one beam formed by using the enabled second antenna and the enabled fourth antenna. For example, the at least one processor may be configured to: while identifying that a value from among the first value greater than the second value and the second value is greater than or equal to the reference value, receive, from the external electronic device, a signal via the beam formed by using the enabled first antenna from among the enabled first antenna and the enabled second antenna; and in response to identifying that change of the quality of the signal received from the external electronic device is outside of reference range, receive, from the external electronic device, the signal via the beam formed by using the enabled second antenna and cease to receive, from the external electronic device, the signal via the beam formed by using the enabled first antenna.

For example, the external electronic device may comprise a base station (e.g., base station 810), and the at least one processor may be configured to: while identifying that a value from among the first value and the second value is greater than or equal to the reference value, receive, from the base station, a signal via the beam formed by using the enabled first antenna from among the beam formed by using the enabled first antenna and the beam formed by using the enabled second antenna; while receiving the signal from the base station, identify that the electronic device is moved from a first sector of the base station to a second sector of the base station adjacent to the first sector; and in response to the identification that the electronic device is moved from the first sector to the second sector, receive, from the base station, the signal via the beam formed by using the enabled second antenna and cease to receive, from the base station, the signal via the beam formed by using the enabled first antenna.

For example, the electronic device may further comprise at least one of an acceleration sensor or global navigation satellite system (GNSS) receiver and the at least one processor may be configured to: obtain data on movement speed via at least one of the acceleration sensor or the GNSS receiver; based on identifying that the movement speed is greater than or equal to a reference speed and a value from among the first value and the second value is greater than or equal to the reference value, enable the first antenna and the second antenna from among the first antenna, the second antenna, the third antenna, and the fourth antenna; based on identifying that the movement speed is less than the reference speed and the first value greater than or equal to the reference value is greater than or equal to the second value, enable the first antenna from among the first antenna, the second antenna, the third antenna, and the fourth antenna; and based on identifying that the movement speed is less than the reference speed and the second value greater than or equal to the reference value is greater than the first value, enable the second antenna from among the first antenna, the second antenna, the third antenna, and the fourth antenna.

For example, the external electronic device may be a base station fixed in a first position, the electronic device may further comprise a global navigation satellite system (GNSS) receiver, and the at least one processor may be configured to: obtain, via the GNSS receiver, data on a location of the electronic device being moved; based on identifying, while a value from among the first value and the second value is greater than or equal to the reference value, that a direction from the location of the electronic device to the first position corresponds to the first direction from among the first direction and the second direction, enable the first antenna from among the first antenna, the second antenna, the third antenna, and the fourth antenna; based on identifying, while a value from among the first value and the second value is greater than or equal to the reference value, that the direction corresponds to the second direction from among the first direction and the second direction, enable the second antenna from among the first antenna, the second antenna, the third antenna, and the fourth antenna; and based on identifying, while a value from among the first value and the second value is greater than or equal to the reference value, that the direction does not correspond to the first direction and the second direction, enable the first antenna from among the first antenna, the second antenna, the third antenna, and the fourth antenna.

For example, the electronic device may further comprise a first radio frequency integrated circuitry (RFIC) (e.g., a first RFIC 1010), connectable through a first switch (e.g., first switch 1031) with an antenna from the first antenna and the fourth antenna, operably coupled with the at least one processor and a second RFIC (e.g., a second switch 1032), connectable through a second switch (e.g., a second RFIC 1020) with an antenna from among the second antenna and the third antenna, the at least one processor may be configured to: based on identifying that a value from among the first value and the second value is greater than or equal to the reference value, enable the first antenna and the second antenna from among the first antenna, the second antenna, the third antenna, and the fourth antenna by controlling the first switch to connect the first RFIC with the first antenna from among the first antenna and the fourth antenna and controlling the second switch to connect the second RFIC with the second antenna from among the second antenna and the third antenna; based on identifying that the first value less than the reference value is greater than or equal to the second value, enable the first antenna and the third antenna from among the first antenna, the second antenna, the third antenna, and the fourth antenna by controlling the first switch to connect the first RFIC with the first antenna from among the first antenna and the fourth antenna and controlling the second switch to connect the second RFIC with the third antenna from among the first antenna, the second antenna, the third antenna, and the fourth antenna; and based on identifying that the second value less than the reference value is greater than the first value, enable the second antenna and the fourth antenna from among the first antenna, the second antenna, the third antenna, and the fourth antenna by controlling the first switch to connect the first RFIC with the fourth antenna from among the first antenna and the fourth antenna and controlling the second switch to connect the second RFIC with the second antenna from among the second antenna and the third antenna.

For example, the electronic device may further comprise a first radio frequency front end (RFFE) (e.g., a first RFFE 1041) comprising the first switch, a first transmit (Tx) chain (e.g., a Tx chain 1042), and a first receive (Rx) chain (e.g., an Rx chain 1043), a second RFFE (e.g., a second RFFE 1051) comprising the second switch, a second Tx chain (e.g., a Tx chain 1052), and a second Rx chain (e.g., an Rx chain 1053), wherein the at least one processor may be configured to while identifying that a value from among the first value and the second value is greater than or equal to the reference value, transmit, to an external electronic device, a signal via at least one of a beam formed by using the first antenna or a beam formed by using the second antenna, by controlling the first switch to connect the first RFIC through the first Tx chain with the first antenna and controlling the second switch to connect the second RFIC through the second Tx chain with the second antenna; while identifying that a value from among the first value and the second value is greater than or equal to the reference value, receive, from the external electronic device, a signal via at least one of a beam formed by using the first antenna or a beam formed by using the second antenna, by controlling the first switch to connect the first RFIC through the first Rx chain with the first antenna and controlling the second switch to connect the second RFIC through the second Rx chain with the second antenna; while identifying that the first value less than the reference value is greater than or equal to the second value, transmit, to the external electronic device, a signal via at least one beam formed by using the first antenna and the third antenna, by controlling the first switch to connect the first RFIC through the first Tx chain with the first antenna and controlling the second switch to connect the second RFIC through the second Tx chain with the third antenna; while identifying that the first value less than the reference value is greater than or equal to the second value, receive, from the external electronic device, a signal via at least one beam formed by using the first antenna and the third antenna, by controlling the first switch to connect the first RFIC through the first Rx chain with the first antenna and controlling the second switch to connect the second RFIC through the second Rx chain with the third antenna; while identifying that the second value less than the reference value is greater than the first value, transmit, to the external electronic device, a signal via at least one beam formed by using the second antenna and the fourth antenna, by controlling the first switch to connect the first RFIC through the first Tx chain with the fourth antenna and controlling the second switch to connect the second RFIC through the second Tx chain with the second antenna; and while identifying that the second value less than the reference value is greater than the first value, receive, from the external electronic device, a signal via at least one beam formed by using the second antenna and the fourth antenna, by controlling the first switch to connect the first RFIC through the first Rx chain with the fourth antenna and controlling the second switch to connect the second RFIC through the second Rx chain with the second antenna.

For example, the at least one processor may be configured to obtain, within part of duration connecting with the base station via at least one beam formed by using the first antenna and the third antenna, the first value indicating quality of a signal received through the at least one beam; obtain, within another part of the duration, disable at least one of the first antenna or the third antenna, enable at least one of the second antenna or the fourth antenna, and obtain the second value indicating quality of a signal received through the at least another beam formed by using at least one of the second antenna or the fourth antenna; based on identifying that both the first value obtained within the part of the duration and the second value obtained within the other part of the duration are less than the reference value and the first value obtained within the part of the duration is greater than or equal to the second value obtained within the other part of the duration, maintain to connect the base station by using the first antenna and the third antenna; and based on identifying that both the first value obtained within the part of the duration and the second value obtained within the other part of the duration are less than the reference value and the second value obtained within the other part of the duration is greater than the first value obtained within the part of the duration, connect, by disabling the first antenna and the third antenna and enabling the second antenna and the fourth antenna, a neighboring base station of the base station by using the second antenna and the fourth antenna.

As described above, the electronic device (e.g., electronic device 101) may comprise a first antenna array (e.g., a first antenna array 710) comprising a first antenna (e.g., a first antenna 711) facing a first direction; a second antenna array (e.g., the second antenna array 720) comprising a second antenna (e.g., a second antenna 722) facing a second direction; and at least one processor (e.g., processor 701), operably coupled with the first antenna array and the second antenna array, configured to obtain a first value indicating a quality of a signal received via the first antenna using a spatial domain reception filter and a second value indicating a quality of a signal received via the second antenna using a spatial domain reception filter; based on identifying that a value from among the first value and the second value is greater than or equal to a reference value, enable both the first antenna and the second antenna; based on identifying that the first value less than the reference value is greater than or equal to the second value, enable the first antenna from among the first antenna and the second antenna; and based on identifying that the second value less than the reference value is greater than the first value, enable the second antenna from among the first antenna and the second antenna.

For example, the electronic device of claim 11, wherein the first antenna array may further comprise a third antenna (e.g., a third antenna 713) facing the first direction, the second antenna array may further comprise a fourth antenna (e.g., a fourth antenna 724) facing the second direction, and the at least one processor may be configured to enable, based on identifying that a value from among the first value and the second value is greater than or equal to the reference value, the first antenna and the second antenna from among the first antenna, the second antenna, the third antenna, and the fourth antenna; based on identifying that the first value less than the reference value is greater than or equal to the second value, enable the first antenna and the third antenna from among the first antenna, the second antenna, the third antenna, and the fourth antenna; and based on identifying that the second value less than the reference value is greater than the first value, enable the second antenna and the fourth antenna from among the first antenna, the second antenna, the third antenna, and the fourth antenna. For example, the at least one processor may be configured to while identifying that a value from among the first value and the second value is greater than or equal to the reference value, communicate, with an external electronic device, via at least one of the enabled first antenna or the enabled second antenna by using a spatial domain transmission filter or a spatial domain reception filter; while identifying that the first value less than the reference value is greater than or equal to the second value, communicate, with the external electronic device, via at least one of the enabled first antenna or the enabled second antenna by using a spatial domain transmission filter or a spatial domain reception filter; and while identifying that the second value less than the reference value is greater than the first value, communicate, with the external electronic device, via at least one beam formed by using the enabled second antenna and the enabled fourth antenna. For example, the at least one processor may be configured to while identifying that a value from among the first value and the second value is greater than or equal to the reference value, receive, from the external electronic device, a signal via the enabled first antenna among the enabled first antenna and the enabled second antenna by using a spatial domain reception filter; and in response to identifying that change of the quality of the signal received from the external electronic device is outside of reference range, receive, from the external electronic device, the signal via the enabled second antenna by using a spatial domain reception filter and cease to receive, from the external electronic device, the signal via the enabled first antenna.

For example, the external electronic device may comprise a base station (e.g., a base station 810), and the at least one processor may be configured to while identifying that a value from among the first value and the second value is greater than or equal to the reference value, receive, from the base station, a signal via the enabled first antenna among the enabled first antenna and the enabled second antenna by using a spatial domain reception filter; while receiving the signal from the base station, identify that the electronic device is moved from a first sector of the base station to a second sector of the base station adjacent to the first sector; and in response to the identification that the electronic device is moved from the first sector to the second sector, receive, from the base station, the signal via the enabled second antenna by using a spatial domain reception filter and cease to receive, from the base station, the signal via the enabled first antenna by using a spatial domain reception filter.

For example, the at least one processor may be configured to obtain, within part of duration connecting with the base station via the first antenna and the third antenna, the first value indicating quality of a signal received via the first antenna and the third antenna by using a spatial domain reception filter; obtain, within another part of the duration, disable at least one of the first antenna or the third antenna, enable at least one of the second antenna or the fourth antenna, and obtain the second value indicating quality of a signal received via the second antenna and the fourth antenna by using a spatial domain reception filter; based on identifying that both the first value obtained within the part of the duration and the second value obtained within the other part of the duration are less than the reference value and the first value obtained within the part of the duration is greater than or equal to the second value obtained within the other part of the duration, maintain to connect the base station via the first antenna and the third antenna; and based on identifying that both the first value obtained within the part of the duration and the second value obtained within the other part of the duration are less than the reference value and the second value obtained within the other part of the duration is greater than the first value obtained within the part of the duration, connect, by disabling the first antenna and the third antenna and enabling the second antenna and the fourth antenna, a neighboring base station of the base station via the second antenna and the fourth antenna.

As described above, a method for operating an electronic device comprising a first antenna array comprising a first antenna facing in a first direction and a second antenna array comprising a second antenna facing in a second direction may comprise obtaining a first value indicating a quality of a signal received via a beam formed by using the first antenna and a second value indicating a quality of a signal received via a beam formed by using the second antenna; based on identifying that a value from among the first value and the second value is greater than or equal to a reference value, enabling both the first antenna and the second antenna; based on identifying that the first value less than the reference value is greater than or equal to the second value, enabling the first antenna from among the first antenna and the second antenna; and based on identifying that the second value less than the reference value is greater than the first value, enabling the second antenna from among the first antenna and the second antenna.

As described above, method for operating an electronic device comprising a first antenna array comprising a first antenna facing in a first direction and a second antenna array comprising a second antenna facing in a second direction may comprise obtaining a first value indicating a quality of a signal received via the first antenna using a spatial domain reception filter and a second value indicating a quality of a signal received via the second antenna using a spatial domain reception filter; based on identifying that a value from among the first value and the second value is greater than or equal to a reference value, enabling both the first antenna and the second antenna; based on identifying that the first value less than the reference value is greater than or equal to the second value, enabling the first antenna from among the first antenna and the second antenna; and based on identifying that the second value less than the reference value is greater than the first value, enabling the second antenna from among the first antenna and the second antenna.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program #40) including one or more instructions that are stored in a storage medium (e.g., internal memory #36 or external memory #38) that is readable by a machine (e.g., the electronic device #01). For example, a processor (e.g., the processor #20) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
    a first antenna array comprising a first antenna facing a first direction;
    a second antenna array comprising a second antenna facing a second direction; and
    at least one processor, operably coupled with the first antenna array and the second antenna array, configured to:
        obtain a first value indicating a quality of a signal received via a beam formed by using the first antenna and a second value indicating a quality of a signal received via a beam formed by using the second antenna;
        based on identifying that a value from among the first value and the second value is greater than or equal to a reference value, enable both the first antenna and the second antenna;
        based on identifying that the first value is less than the reference value and is greater than or equal to the second value, enable the first antenna from among the first antenna and the second antenna; and
        based on identifying that the second value is less than the reference value and is greater than the first value, enable the second antenna from among the first antenna and the second antenna.

2. The electronic device of claim 1, wherein the first antenna array further comprises a third antenna facing the first direction,
    wherein the second antenna array further comprises a fourth antenna facing the second direction, and
    wherein the at least one processor is configured to:
        based on identifying that a value from among the first value and the second value is greater than or equal to the reference value, enable the first antenna and the second antenna from among the first antenna, the second antenna, the third antenna, and the fourth antenna;

based on identifying that the first value is less than the reference value and is greater than or equal to the second value, enable the first antenna and the third antenna from among the first antenna, the second antenna, the third antenna, and the fourth antenna; and based on identifying that the second value is less than the reference value and is greater than the first value, enable the second antenna and the fourth antenna from among the first antenna, the second antenna, the third antenna, and the fourth antenna.

3. The electronic device of claim 2, wherein the at least one processor is configured to:

based on identifying that a value from among the first value and the second value is greater than or equal to the reference value, communicate, with an external electronic device, via a beam formed by using the enabled first antenna and/or a beam formed by using the enabled second antenna;

while identifying that the first value is less than the reference value and is greater than or equal to the second value, communicate, with the external electronic device, via at least one beam formed by using the enabled first antenna and the enabled third antenna; and while identifying that the second value is less than the reference value and is greater than the first value, communicate, with the external electronic device, via at least one beam formed by using the enabled second antenna and the enabled fourth antenna.

4. The electronic device of claim 3, wherein the at least one processor is configured to:

while identifying that a value from among the first value greater than the second value and the second value is greater than or equal to the reference value and the first value is greater than the second value, receive, from the external electronic device, a signal via the beam formed by using the enabled first antenna from among the enabled first antenna and the enabled second antenna; and in response to identifying that change of a quality of the signal received from the external electronic device is outside of a reference range, receive, from the external electronic device, the signal via the beam formed by using the enabled second antenna and cease to receive, from the external electronic device, the signal via the beam formed by using the enabled first antenna.

5. The electronic device of claim 3, wherein the external electronic device comprises a base station, and wherein the at least one processor is configured to:

while identifying that a value from among the first value and the second value is greater than or equal to the reference value, receive, from the base station, a signal via the beam formed by using the enabled first antenna from among the beam formed by using the enabled first antenna and the beam formed by using the enabled second antenna;

while receiving the signal from the base station, identify that the electronic device is moved from a first sector of the base station to a second sector of the base station adjacent to the first sector; and in response to identifying that the electronic device is moved from the first sector to the second sector, receive, from the base station, the signal via the beam formed by using the enabled second antenna and cease to receive, from the base station, the signal via the beam formed by using the enabled first antenna.

6. The electronic device of claim 2, further comprising an acceleration sensor and/or a global navigation satellite system (GNSS) receiver, wherein the at least one processor is configured to:

obtain data on movement speed via the acceleration sensor and/or the GNSS receiver;

based on identifying that the movement speed is greater than or equal to a reference speed and a value from among the first value and the second value is greater than or equal to the reference value, enable the first antenna and the second antenna from among the first antenna, the second antenna, the third antenna, and the fourth antenna;

based on identifying that the movement speed is less than the reference speed and the first value greater than or equal to the reference value is greater than or equal to the second value, enable the first antenna from among the first antenna, the second antenna, the third antenna, and the fourth antenna; and based on identifying that the movement speed is less than the reference speed and the second value greater than or equal to the reference value is greater than the first value, enable the second antenna from among the first antenna, the second antenna, the third antenna, and the fourth antenna.

7. The electronic device of claim 3, wherein the external electronic device is a base station fixed in a first position, wherein the electronic device further comprises a global navigation satellite system (GNSS) receiver, and wherein the at least one processor is configured to:

obtain, via the GNSS receiver, data on a location of the electronic device currently moving;

based on identifying a value from among the first value and the second value is greater than or equal to the reference value, and on identifying that a direction from the location of the electronic device to the first position corresponds to the first direction from among the first direction and the second direction, enable the first antenna from among the first antenna, the second antenna, the third antenna, and the fourth antenna;

based on identifying a value from among the first value and the second value is greater than or equal to the reference value, and on identifying that the direction corresponds to the second direction from among the first direction and the second direction, enable the second antenna from among the first antenna, the second antenna, the third antenna, and the fourth antenna; and based on identifying a value from among the first value and the second value is greater than or equal to the reference value, and on identifying that the direction is different from the first direction and the second direction, enable the first antenna and the second antenna from among the first antenna, the second antenna, the third antenna, and the fourth antenna.

8. The electronic device of claim 2, further comprising:

a first radio frequency integrated circuitry (RFIC), connectable through a first switch with the first antenna and the fourth antenna, operably coupled with the at least one processor; and a second RFIC, connectable through a second switch with the second antenna and the third antenna, wherein the at least one processor is configured to:
based on identifying that a value from among the first value and the second value is greater than or equal to the reference value, enable the first antenna and the second antenna from among the first antenna, the second antenna, the third antenna, and the fourth antenna by controlling the first switch to connect the first RFIC with the first antenna from among the first antenna and the fourth antenna and controlling the second switch to connect the second RFIC with the second antenna from among the second antenna and the third antenna;

based on identifying that the first value less than the reference value is greater than or equal to the second value, enable the first antenna and the third antenna from among the first antenna, the second antenna, the third antenna, and the fourth antenna by controlling the first switch to connect the first RFIC with the first antenna from among the first antenna and the fourth antenna and controlling the second switch to connect the second RFIC with the third antenna from among the second antenna and the third antenna; and based on identifying that the second value less than the reference value is greater than the first value, enable the second antenna and the fourth antenna from among the first antenna, the second antenna, the third antenna, and the fourth antenna by controlling the first switch to connect the first RFIC with the fourth antenna from among the first antenna and the fourth antenna and controlling the second switch to connect the second RFIC with the second antenna from among the second antenna and the third antenna.

9. The electronic device of claim 8, further comprising:
a first radio frequency front end (RFFE) comprising the first switch, a first transmit (Tx) chain, and a first receive (Rx) chain;
a second RFFE comprising the second switch, a second Tx chain, and a second Rx chain,
wherein the at least one processor is configured to:
while identifying that a value from among the first value and the second value is greater than or equal to the reference value, transmit, to an external electronic device, a signal via a beam formed by using the first antenna and/or a beam formed by using the second antenna, by controlling the first switch to connect the first RFIC through the first Tx chain with the first antenna and controlling the second switch to connect the second RFIC through the second Tx chain with the second antenna;

while identifying that a value from among the first value and the second value is greater than or equal to the reference value, receive, from the external electronic device, a signal via the beam formed by using the first antenna and/or the beam formed by using the second antenna, by controlling the first switch to connect the first RFIC through the first Rx chain with the first antenna and controlling the second switch to connect the second RFIC through the second Rx chain with the second antenna;

while identifying that the first value is less than the reference value and is greater than or equal to the second value, transmit, to the external electronic device, a signal via at least one beam formed by using the first antenna and the third antenna, by controlling the first switch to connect the first RFIC through the first Tx chain with the first antenna and controlling the second switch to connect the second RFIC through the second Tx chain with the third antenna;

while identifying that the first value is less than the reference value and is greater than or equal to the second value, receive, from the external electronic device, a signal via at least one beam formed by using the first antenna and the third antenna, by controlling the first switch to connect the first RFIC through the first Rx chain with the first antenna and controlling the second switch to connect the second RFIC through the second Rx chain with the third antenna;

while identifying that the second value is less than the reference value and is greater than the first value, transmit, to the external electronic device, a signal via at least one beam formed by using the second antenna and the fourth antenna, by controlling the first switch to connect the first RFIC through the first Tx chain with the fourth antenna and controlling the second switch to connect the second RFIC through the second Tx chain with the second antenna; and while identifying that the second value is less than the reference value and is greater than the first value, receive, from the external electronic device, a signal via at least one beam formed by using the second antenna and the fourth antenna, by controlling the first switch to connect the first RFIC through the first Rx chain with the fourth antenna and controlling the second switch to connect the second RFIC through the second Rx chain with the second antenna.

10. The electronic device of claim 2, wherein the at least one processor is configured to:
obtain, within a part of a duration in which the electronic device is connected with a base station via at least one beam formed by using the first antenna and the third antenna, the first value indicating the quality of a signal received through the at least one beam;
within another part of the duration, disable the first antenna and/or the third antenna, enable the second antenna and/or the fourth antenna, and obtain the second value indicating the quality of a signal received through at least another beam formed by using the second antenna and/or the fourth antenna;
based on identifying that both the first value and the second value are less than the reference value and the first value is greater than or equal to the second value, maintain connection to the base station by using the first antenna and the third antenna; and
based on identifying that both the first value and the second value are less than the reference value and the second value is greater than the first value, connect, by disabling the first antenna and the third antenna and enabling the second antenna and the fourth antenna, a neighboring base station of the base station by using the second antenna and the fourth antenna.

11. An electronic device comprising:
a first antenna array comprising a first antenna facing a first direction;
a second antenna array comprising a second antenna facing a second direction; and
at least one processor, operably coupled with the first antenna array and the second antenna array, configured to:
obtain a first value indicating a quality of a signal received via the first antenna using a spatial domain reception filter and a second value indicating a quality of a signal received via the second antenna using a spatial domain reception filter;

based on identifying that a value from among the first value and the second value is greater than or equal to a reference value, enable both the first antenna and the second antenna;

based on identifying that the first value is less than the reference value and is greater than or equal to the second value, enable the first antenna from among the first antenna and the second antenna; and based on identifying that the second value is less than the reference value and is greater than the first value, enable the second antenna from among the first antenna and the second antenna.

12. The electronic device of claim 11, wherein the first antenna array further comprises a third antenna facing the first direction, wherein the second antenna array further comprises a fourth antenna facing the second direction, and wherein the at least one processor is configured to:

based on identifying that a value from among the first value and the second value is greater than or equal to the reference value, enable the first antenna and the second antenna from among the first antenna, the second antenna, the third antenna, and the fourth antenna;

based on identifying that the first value is less than the reference value and is greater than or equal to the second value, enable the first antenna and the third antenna from among the first antenna, the second antenna, the third antenna, and the fourth antenna; and based on identifying that the second value is less than the reference value and is greater than the first value, enable the second antenna and the fourth antenna from among the first antenna, the second antenna, the third antenna, and the fourth antenna.

13. The electronic device of claim 12, wherein the at least one processor is configured to:

while identifying that a value from among the first value and the second value is greater than or equal to the reference value, communicate, with an external electronic device, via the enabled first antenna and/or the enabled second antenna by using a spatial domain transmission filter and/or the spatial domain reception filter;

while identifying that the first value is less than the reference value and is greater than or equal to the second value, communicate, with the external electronic device, via the enabled first antenna and the enabled third antenna by using the spatial domain transmission filter and/or the spatial domain reception filter; and while identifying that the second value is less than the reference value and is greater than the first value, communicate, with the external electronic device, via the enabled second antenna and the enabled fourth antenna by using the spatial domain transmission filter and/or the spatial domain reception filter.

14. The electronic device of claim 13, wherein the at least one processor is configured to:

based on identifying that a value from among the first value and the second value is greater than or equal to the reference value and the first value is greater than the second value, receive, from the external electronic device, a signal via the enabled first antenna among the enabled first antenna and the enabled second antenna by using the spatial domain reception filter; and in response to identifying that change of a quality of the signal received from the external electronic device is outside of a reference range, receive, from the external electronic device, the signal via the enabled second antenna by using the spatial domain reception filter and cease to receive, from the external electronic device, the signal via the enabled first antenna.

15. The electronic device of claim 13, wherein the external electronic device comprises a base station, and wherein the at least one processor is configured to:

while identifying that a value from among the first value and the second value is greater than or equal to the reference value, receive, from the base station, a signal via the enabled first antenna among the enabled first antenna and the enabled second antenna by using the spatial domain reception filter;

while receiving the signal from the base station, identify that the electronic device is moved from a first sector of the base station to a second sector of the base station adjacent to the first sector; and in response to identifying that the electronic device is moved from the first sector to the second sector, receive, from the base station, the signal via the enabled second antenna by using the spatial domain reception filter and cease to receive, from the base station, the signal via the enabled first antenna by using the spatial domain reception filter.

16. The electronic device of claim 12, further comprising an acceleration sensor and/or a global navigation satellite system (GNSS) receiver, wherein the at least one processor is configured to:

obtain data on movement speed via the acceleration sensor and/or the GNSS receiver;

based on identifying that the movement speed is greater than or equal to a reference speed and a value from among the first value and the second value is greater than or equal to the reference value, enable the first antenna and the second antenna from among the first antenna, the second antenna, the third antenna, and the fourth antenna;

based on identifying that the movement speed is less than the reference speed and the first value greater than or equal to the reference value is greater than or equal to the second value, enable the first antenna from among the first antenna, the second antenna, the third antenna, and the fourth antenna; and based on identifying that the movement speed is less than the reference speed and the second value greater than or equal to the reference value is greater than the first value, enable the second antenna from among the first antenna, the second antenna, the third antenna, and the fourth antenna.

17. The electronic device of claim 13, wherein the external electronic device is a base station fixed in a first position, wherein the electronic device further comprises a global navigation satellite system (GNSS) receiver, and wherein the at least one processor is configured to:

obtain, via the GNSS receiver, data on a location of the electronic device currently moving;

based on identifying a value from among the first value and the second value is greater than or equal to the reference value, and on identifying that a direction from the location of the electronic device to the first position corresponds to the first direction from among the first direction and the second direction, enable the first antenna from among the first antenna, the second antenna, the third antenna, and the fourth antenna;
based on identifying a value from among the first value and the second value is greater than or equal to the reference value, and on identifying that the direction corresponds to the second direction from among the first direction and the second direction, enable the second antenna from among the first antenna, the second antenna, the third antenna, and the fourth antenna; and
based on identifying a value from among the first value and the second value is greater than or equal to the reference value, and on identifying that the direction is different from the first direction and the second direction, enable the first antenna and the second antenna from among the first antenna, the second antenna, the third antenna, and the fourth antenna.

18. The electronic device of claim 12, further comprising:
a first radio frequency integrated circuitry (RFIC), connectable through a first switch with the first antenna and the fourth antenna, operably coupled with the at least one processor; and
a second RFIC, connectable through a second switch with the second antenna and the third antenna,
wherein the at least one processor is configured to:
based on identifying that a value from among the first value and the second value is greater than or equal to the reference value, enable the first antenna and the second antenna from among the first antenna, the second antenna, the third antenna, and the fourth antenna by controlling the first switch to connect the first RFIC with the first antenna from among the first antenna and the fourth antenna and controlling the second switch to connect the second RFIC with the second antenna from among the second antenna and the third antenna;
based on identifying that the first value less than the reference value is greater than or equal to the second value, enable the first antenna and the third antenna from among the first antenna, the second antenna, the third antenna, and the fourth antenna by controlling the first switch to connect the first RFIC with the first antenna from among the first antenna and the fourth antenna and controlling the second switch to connect the second RFIC with the third antenna from among the second antenna and the third antenna; and
based on identifying that the second value less than the reference value is greater than the first value, enable the second antenna and the fourth antenna from among the first antenna, the second antenna, the third antenna, and the fourth antenna by controlling the first switch to connect the first RFIC with the fourth antenna from among the first antenna and the fourth antenna and controlling the second switch to connect the second RFIC with the second antenna from among the second antenna and the third antenna.

19. The electronic device of claim 18, further comprising:
a first radio frequency front end (RFFE) comprising a first transmit (Tx) chain, and a first receive (Rx) chain;
a second RFFE comprising, a second Tx chain, and a second Rx chain,
wherein the at least one processor is configured to:
while identifying that a value from among the first value and the second value is greater than or equal to the reference value, transmit, to an external electronic device, a signal via the first antenna and the second antenna by using a spatial domain transmission filter, by controlling the first switch to connect the first RFIC through the first Tx chain with the first antenna and controlling the second switch to connect the second RFIC through the second Tx chain with the second antenna;
while identifying that a value from among the first value and the second value is greater than or equal to the reference value, receive, from the external electronic device, a signal via the first antenna and the second antenna by using the spatial domain reception filter, by controlling the first switch to connect the first RFIC through the first Rx chain with the first antenna and controlling the second switch to connect the second RFIC through the second Rx chain with the second antenna;
while identifying that the first value is less than the reference value and is greater than or equal to the second value, transmit, to the external electronic device, a signal via the first antenna and the third antenna by using the spatial domain transmission filter, by controlling the first switch to connect the first RFIC through the first Tx chain with the first antenna and controlling the second switch to connect the second RFIC through the second Tx chain with the third antenna;
while identifying that the first value is less than the reference value and is greater than or equal to the second value, receive, from the external electronic device, a signal via the first antenna and the third antenna by using the spatial domain reception filter, by controlling the first switch to connect the first RFIC through the first Rx chain with the first antenna and controlling the second switch to connect the second RFIC through the second Rx chain with the third antenna;
while identifying that the second value is less than the reference value and is greater than the first value, transmit, to the external electronic device, a signal via the second antenna and the fourth antenna by using the spatial domain transmission filter, by controlling the first switch to connect the first RFIC through the first Tx chain with the fourth antenna and controlling the second switch to connect the second RFIC through the second Tx chain with the second antenna; and
while identifying that the second value is less than the reference value and is greater than the first value, receive, from the external electronic device, a signal via the second antenna and the fourth antenna by using the spatial domain reception filter, by controlling the first switch to connect the first RFIC through the first Rx chain with the fourth antenna and controlling the second switch to connect the second RFIC through the second Rx chain with the second antenna.

20. The electronic device of claim 12, wherein the at least one processor is configured to:
obtain, within a part of a duration in which the electronic device is connected with a base station via the first antenna and the third antenna, the first value indicating the quality of a signal received via the first antenna and the third antenna by using the spatial domain reception filter;
within another part of the duration, disable at least one of the first antenna and/or the third antenna, enable the second antenna and/or the fourth antenna, and obtain the second value indicating the quality of a signal received via the second antenna and/or the fourth antenna by using the spatial domain reception filter;

based on identifying that both the first value and the second value are less than the reference value and the first value is greater than or equal to the second value, maintain connection to the base station via the first antenna and the third antenna; and based on identifying that both the first value and the second value are less than the reference value and the second value is greater than the first value, connect, by disabling the first antenna and the third antenna and enabling the second antenna and the fourth antenna, a neighboring base station of the base station via the second antenna and the fourth antenna.

* * * * *